United States Patent
Park et al.

(10) Patent No.: US 7,718,059 B2
(45) Date of Patent: May 18, 2010

(54) APPARATUS FOR PRODUCING MAGNETIZED WATER

(75) Inventors: Kyung Bae Park, Daejon-si (KR); Yeong-Garp Cho, Daejon-si (KR); Deuk-Gun Park, Daejon-si (KR)

(73) Assignee: Korea Atomic Energy Research Institute, Daejon-si (KR)

( * ) Notice: Subject to any disclaimer, the term of this patent is extended or adjusted under 35 U.S.C. 154(b) by 902 days.

(21) Appl. No.: 11/540,828

(22) Filed: Sep. 28, 2006

(65) Prior Publication Data

US 2007/0151912 A1    Jul. 5, 2007

(30) Foreign Application Priority Data

Dec. 31, 2005    (KR) .................... 10-2005-0136257

(51) Int. Cl.
*C02F 1/48* (2006.01)
(52) U.S. Cl. .................. 210/222; 210/232; 210/322; 210/695
(58) Field of Classification Search .......... 210/222, 210/232, 322, 695
See application file for complete search history.

(56) References Cited

U.S. PATENT DOCUMENTS 5,871,642 A * 2/1999 Meeks ................. 210/222

FOREIGN PATENT DOCUMENTS

| JP | 2007181817 A * | 7/2007 |
|---|---|---|
| KR | 10-2004-0057857 | 7/2004 |
| KR | 10-2005-0076425 | 7/2005 |

* cited by examiner

*Primary Examiner*—David A Reifsnyder
(74) *Attorney, Agent, or Firm*—Bachman & LaPointe, P.C.

(57) ABSTRACT

An apparatus for producing magnetized water. The apparatus comprises a plurality of magnet bars arranged in a radial manner, in which each magnet bar is structured such that a plurality of neodymium based permanent magnets is stacked in a stainless steel pipe in a manner such that like poles of the permanent magnets face each other. Thanks to this structure, the apparatus has a large contact area between the magnetic field and water flowing through the apparatus, thereby activating water by changing the structure of water. In more detail, the apparatus comprises a magnet bunch including a plurality of fixed magnet bars, a plurality of standard magnet bars, an upper plate disposed on upper ends of the fixed and standard magnet bars, a lower plate disposed on lower ends of the fixed and standard magnet bars, and a spacing plate disposed between the upper and lower plates; a housing having a cylindrical main body for enclosing the magnet bunch therein, an opening in an upper end portion thereof, and a lower part having a funnel shape and a liquid passage; and a cover 50 for covering the opening of the housing, the cover being coupled to the housing in a detachable manner and having a funnel shape and a liquid passage.

33 Claims, 14 Drawing Sheets

APPARATUS FOR PRODUCING MAGNETIZED WATER

BACKGROUND OF THE INVENTION

1. Field of the Invention

The present invention relates to an apparatus for producing magnetized water. More particularly, the present invention relates to an apparatus for producing magnetized water by changing the arrangement of molecules of water in order to activate water, in which the apparatus comprises a plurality of magnet bars arranged in a radial manner to expose a larger amount of water molecules to a magnetic field, each magnet bar comprising a stainless steel tube and neodymium (Nd)-based permanent magnets enclosed in the stainless steel tube and arranged in a manner such that like poles of the magnets face each other.

2. Description of the Related Art

There have been many general ways to activate water. Examples of ways include an irradiation method that irradiates heat, infrared rays, ultraviolet rays, far infrared rays, or gamma rays onto water, an electrolysis method using electricity, and a magnetization method using magnetic force, in order to partially change the arrangement of water molecules.

The magnetization method generally uses electromagnets and/or permanent magnets to magnetize water. This magnetization method changes the structure of drinking water such as tap water, underground water, natural source water, agricultural water, and industrial water, thereby producing functional water that is helpful to maintain the lives of living things.

The magnetization method is the most competitive water activation method from the viewpoints of convenience, efficiency and cost.

On the other hand, conventional magnetizing apparatus has a disadvantage of having weak magnetic force since it uses an oxidized steel-based magnet, and generally uses flat panel type magnets.

For example, according to the conventional art, magnetized water is produced by installing magnets around a tap water pipe, in more detail, on the top, the bottom, and both opposite sides of the water pipe in such a manner that N poles and S poles face each other in order to create a magnetic field in the water pipe and passing water through the water pipe.

The magnetized water production apparatus having the above described structure is disadvantageous in that the magnetic field is not uniformly distributed in the water pipe when magnets based on neodymium (Nd), having a relatively strong magnetic force, generally 10,000 G, are installed on the exterior of the water pipe, on the top of the water pipe (0 degrees) and the bottom of the water pipe (180 degrees), respectively. That is, magnetic force is dispersed weakly in the directions of 90 and 270 degrees.

Further, since the intensity of magnetic force transferred to the center of the water pipe varies according to the diameters of the water pipes, the magnetic field is not uniform in the water pipe. That is, since the intensity of a magnetic field is inversely proportional to the square of the distance therefrom, the intensity of a magnetic field sharply decreases from the inner contact surface of the water pipe toward the center of the water pipe as the distance from the inner contact surface increases. Accordingly, there is a problem in that the intensity of the magnetic field transferred to the center of the water pipe varies according to the diameter of the water pipes.

In order to solve the above-described problem encountered when using the flat panel type magnet, i.e. in order to enhance the uniformity of magnetic force, an improved apparatus using a permanent magnet having a sectional shape, which can be directly connected to the water pipe, has been suggested. However, this apparatus also has the same problem.

A variety of different types of apparatus for producing magnetized water, which can be used by being connected to a water pipe and enclose permanent magnets therein, are manufactured and sold domestically and overseas, but these apparatus also have the problem that magnetic force decreases as the distance increases.

Here, the following two aspects must be considered in order to solve the above described problem.

First, the structures and the characteristics of water, which is the object to be magnetized, change according to changes in environmental factors.

That is, water in a liquid state does not simply exist in the form of independent $H_2O$ molecules but exists as clusters due to hydrogen bonds. That is, attractive force is formed between oxygen atoms, having high electronegativity, and hydrogen atoms, having low electronegativity, so that many water molecules tend to cluster together.

Recent research indicates that in a liquid state, an icosahedral water cluster consisting of 280 water molecules and having a diameter of 3 nanometers has a dodecahedron having a diameter of 3.94 angstroms therein, with a cavity therebetween. Further, smaller water clusters are formed in the dodecahedron, so that the water cluster looks like a sphere comprising many layers of spherical shells, when viewing the water cluster from the outside.

In the cavity, structure forming ions, such as calcium (Ca), or solutes exist. In this state, if water is magnetized, the water cluster is broken into small size clusters since hydrogen bonds are broken, so that the magnetized water becomes highly biodegradable. Accordingly, the magnetized water serves as good vital functional water.

According to another recent report, cells of living things have aquaporins (water channels), and only water in a single molecular state can pass through the aquaporins. According to an analysis method, oxygen $^{17}$NMR ($^{17}$O-NMR), which is one of the few known methods of verifying water cluster size, a cluster splits in units of a size corresponding to changes in the width (at half peak height) of $^{17}$O NMR resonance signal.

However, there is also an opinion arguing that the cluster size cannot be determined from the NMR spectrum result since the result is highly dependent on the pH of water and the concentration and kinds of solutes in water.

For this reason, there have been a lot of discussions in the scientific academic world, and in February 2005 the Japanese Functional Foundation came to the conclusion that the cluster size cannot be normally determined from the width of half heights of a peak of $^{17}$O-NMR signal.

Anyway, the view that water clusters must be split into small size clusters or molecules in order for water to be effectively biodegradable is shared by scientists.

A hydrogen bond in a water cluster is maintained for about 1 to 20 picoseconds, and the lifespan of a hydrogen bonding which is cut once is very short, about 0.1 picoseconds. The hydrogen bonding is cut and then reformed continuously, thereby resulting in a state of equilibrium.

For reference, stably keeping water in the state of small size clusters is not achievable in pure water but needs solutes dissolved in the water.

As described above, structure forming ions, such as calcium (Ca), contribute to the stabilization of the dodecahedral structure, but negatively affect regular icosahedron structure, so that water having the regular icosahedron structure tends to more actively cluster in a larger size, resulting in low biodegradability in cells.

In particular, when structure destroying ions or hazardous substances exist in water, clustering of water molecules becomes even more severe. According to the experience of users who have used active water for a long time, magnetized active water improves health and growth benefits.

The miraculous characteristics of water have not been fully discovered so far, and the disclosure thereof remains a task for the future.

Second, the capacity to magnetize water depends on the structure of a magnetizing apparatus, the shape of magnets, the distribution of a magnetic field, and the way of arranging magnets.

Accordingly, the conventional arts such as partially improving or modifying conventional magnetizing apparatus, increasing the speed of water flow by changing the flow of water passing through a magnetic field from laminar to turbulent, and increasing the length of the apparatus, are not fundamental solutions and thus it is a matter of urgency to provide fundamental solutions.

SUMMARY OF THE INVENTION

Accordingly, the present invention has been made keeping in mind the above problems occurring in the related art, and an object of the present invention is to provide a magnetized water production apparatus having magnet bars arranged in a radial manner in order to allow a larger amount of water to be exposed to a magnetic field per a unit area, thereby splitting a large cluster of water molecules, each magnet bar comprising a stainless steel tube and neodymium (Nd) based permanent magnet pellets having different diameters enclosed in the stainless steel tube. Further, the magnet bars are coated with natural stone, ceramic or mixtures thereof, generating anions and far infrared rays, in order to achieve a synergistic effect in combination with the above described structure. Since the apparatus is manufactured such that it can be disassembled, the apparatus can be conveniently washed and maintained, can be directly connected to a water pipe, can be directly installed in a water pipe, can be conveniently used, and can effectively activate water.

By passing water through the magnetized water production apparatus according to the present invention, the water can be sterilized, so that it is possible to prevent various waterborne diseases, and leads to the reduced use of sodium hypochlorite which is a sterilizing chemical used in water works. Further, since the specific heat of water decreases after the water is magnetized by using the apparatus, the consumption of energy for heating water can be reduced. Still further, it is possible to increase a washing effect with decreased usage of detergent if water magnetized using the apparatus according to the present invention is used. The apparatus according to the present invention can be used to activate blood and oil such as kerosene, gasoline, and so on.

In order to achieve the above object, there is provided a magnetized water production apparatus, comprising a magnet bunch including a plurality of fixed magnet bars, a plurality of standard magnet bars, an upper plate disposed on upper ends of the fixed and standard magnet bars, a lower plate disposed on lower ends of the fixed and standard magnet bars, and a spacing plate disposed between the upper and lower plates; a housing having a cylindrical main body for enclosing the magnet bunch therein, an opening at an upper end portion thereof, and a lower part having a funnel shape and a liquid passage; and a cover for covering the opening of the housing, the cover being coupled to the housing in a detachable manner and having a funnel shape and a liquid passage.

The fixed magnet bars and the standard magnet bars may be made of stainless steel.

The fixed and standard magnet bars may be made of synthetic resin.

In each of the fixed and standard magnet bars, a plurality of permanent magnets may be arranged such that like poles thereof face each other.

The permanent magnets may be made of cobalt/nickel or neodymium.

Spacing plates may be provided at every interface between the adjacent permanent magnets in order to reduce a gap between the adjacent permanent magnets.

Each of the fixed and standard magnet bars may have a hollowed cylindrical body which is sealed by an upper cover and a lower cover, respectively, through a welding method.

Each of the fixed magnet bars may have a key protrusion on the upper cover thereof, and may have a key groove corresponding to the key protrusion on the lower cover thereof, so that the key protrusion and the key groove engage with each other.

The key protrusion may be sequentially provided with a flat washer and a spring washer.

The key protrusion may have a threaded portion on its circumferential outer surface, and may engage with a hexagonal nut.

The lower plate of each of the fixed magnet bars may have a protrusion.

A spacing pipe may be installed to surround each of the fixed magnet bars, and the spacing pipes may be provided to an upper and a lower side of the spacing plate in order to position the spacing plate at a center portion of the fixed magnet bar.

A coating layer formed of natural stones, ceramics or mixtures thereof, generating anions and far infrared rays, may be formed on the outer surfaces of the fixed and standard magnet bars.

Each of the upper plate and the lower plate may be a disk-shaped plate, have a plurality of installation holes, arranged at regular intervals and being through holes, and a liquid passing hole, and have a plurality of installation grooves, each provided with a spring washer, in which the fixed magnet bars are installed such that respective ends of each of the fixed magnet bars are inserted into the installation holes of the upper and lower plates, and the standard magnet bars are installed such that respective ends of each of the standard magnet bars are received in the installation grooves formed in the upper and lower plates.

Diameters of the liquid passing holes formed to penetrate the upper and lower plates, respectively, may be different from each other.

Diameters of the liquid passing holes formed to penetrate the upper and lower plates, respectively, may be the same.

Each of the upper plate and the lower plate may be a disk-shaped plate, have a plurality of installation holes, arranged at irregular intervals and being through holes, have a liquid passing hole, and have a plurality of installation grooves, each provided with a spring washer, in which the fixed magnet bars are installed in a manner such that both ends of each of the fixed magnet bars are inserted into the installation holes of the upper and lower plates, respectively, and the standard magnet bars are installed in a manner such that respective ends of each of the standard magnet bars are received in the installation grooves formed in the upper and lower plates, respectively.

The upper plate may have a central hole in a center portion thereof, and a plurality of installation holes and a plurality of installation grooves around the central hole, and the lower plate may have a central support at a center portion thereof and a plurality of installation holes and a plurality of installation grooves, and the fixed magnet bars may be installed in a manner such that respective ends of each of the fixed magnet bars are inserted into corresponding installation holes in the upper and lower plates, and the standard magnet bars may be installed in a manner such that respective ends of each of the standard magnet bare are received in the corresponding installation grooves of the upper and lower plates.

The spacing plate may be a disk-shaped plate, and have a plurality of spacing holes and liquid passing hole, in which the holes are through holes and are arranged at regular intervals, so that the fixed and standard magnet bars are installed by being passed through the spacing holes.

The liquid passing holes formed to penetrate the spacing plate may have different diameters.

The liquid passing holes formed to penetrate the spacing plate may have the same diameter.

The spacing plate may be a disk-shaped plate, and have a plurality of spacing holes and liquid passing holes, in which the holes are through holes and are arranged at irregular intervals, so that the fixed and standard magnet bars are installed by being passed through the spacing holes.

The spacing plate may have a central spacing hole at a center portion thereof, and a plurality of spacing holes around the central spacing hole, in which the central spacing hole and the spacing holes are through holes.

The housing and the cover may be made of stainless steel.

The housing and the cover may be made of synthetic resin.

The inner surfaces of the housing and the cover may be coated with natural stone, ceramic, and mixtures thereof, generating anions and far infrared rays.

The housing may have an O-ring contact part on an inner surface thereof near the opening, in which an O-ring is disposed on the O-ring contact part.

The housing may have an external O-ring groove on an outer surface near the opening thereof, and an O-ring may be disposed in the O-ring groove.

The housing may have a support sill for supporting the magnet bunch, in which the support sill is formed on and along the circumferential inner surface thereof.

The housing and the cover may have respective threads to allow the housing and the cover to be coupled to external devices.

The housing may have a threaded portion on an outer surface and near an upper end portion thereof, and the cover may have a threaded portion on an upper surface and near a lower end portion thereof, so that the housing and the cover are coupled by a screwing manner.

The housing and the cover may have respective octagonal portions on outer surfaces.

The magnet bunch may have elastic rubber rings near upper and lower end portions and on outer surfaces thereof, so that the magnet bunches can be directly installed in a water pipe.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
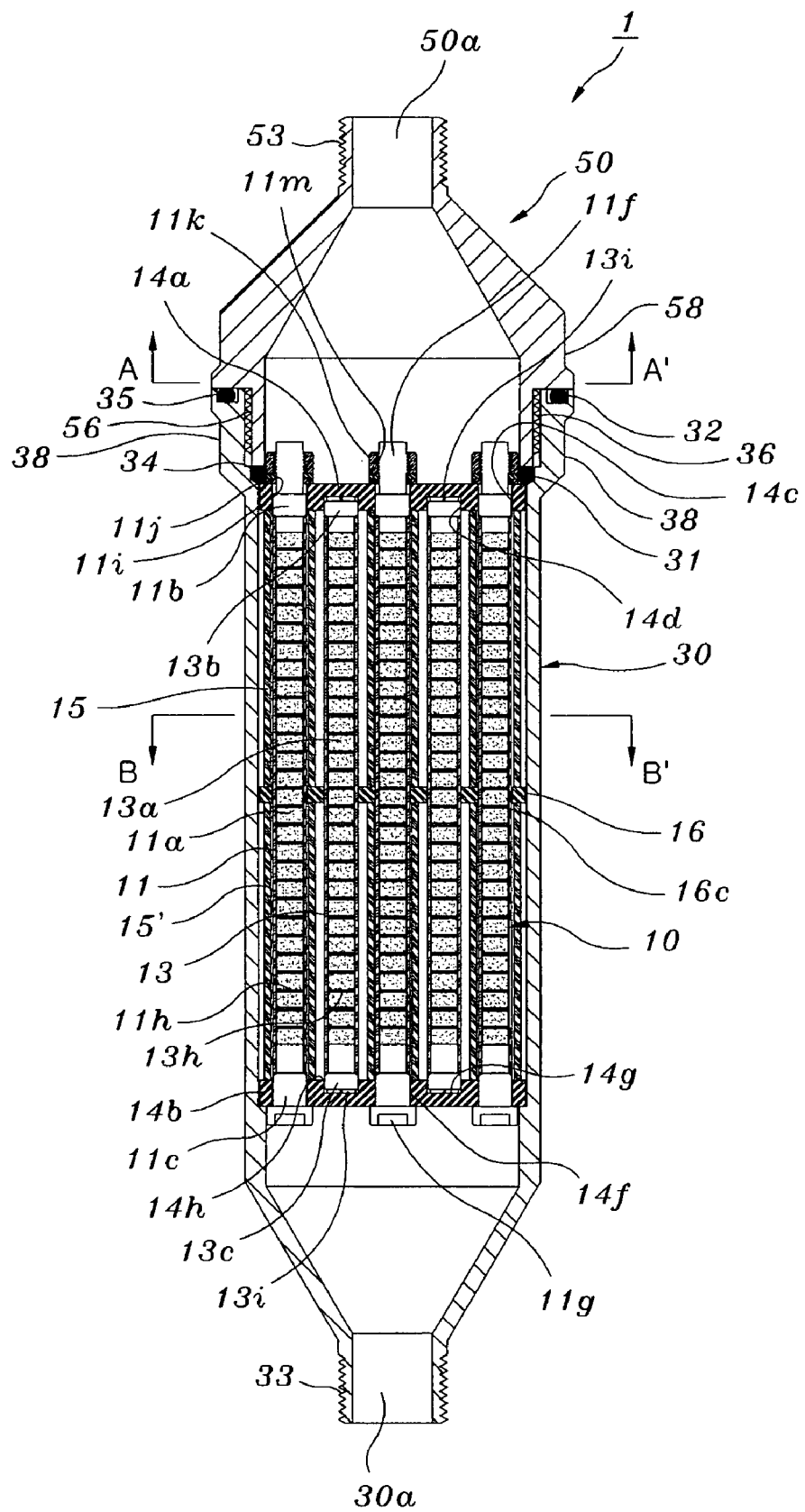
FIG. 1 is a schematic view illustrating an apparatus for producing magnetized water, according to one embodiment of the present invention.
Figure 2:
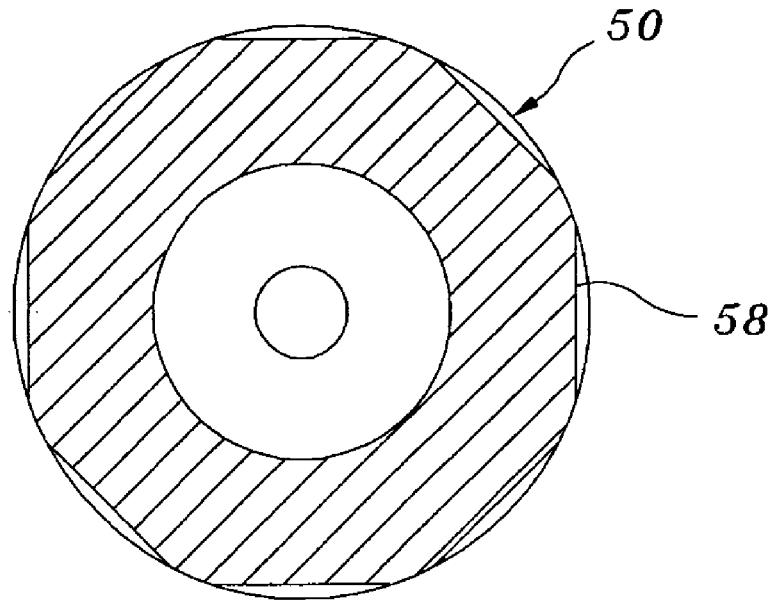
FIG. 2 is a sectional view taken along the line A-A' shown in FIG. 1.
Figure 3:
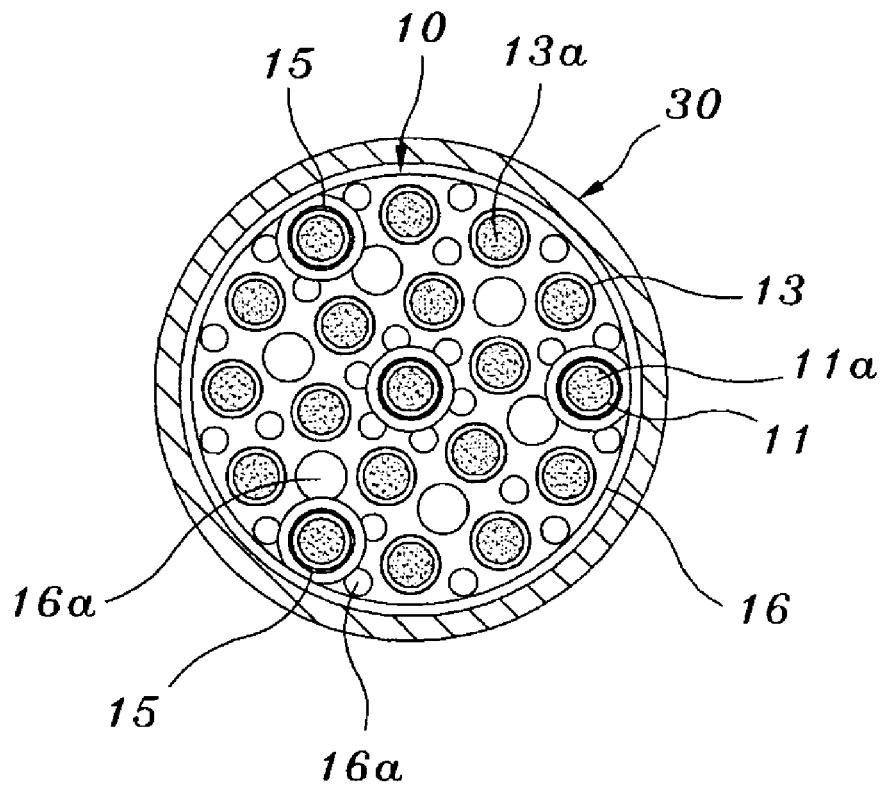
FIG. 3 is a sectional view taken along the line B-B' in FIG. 1.
Figure 4:
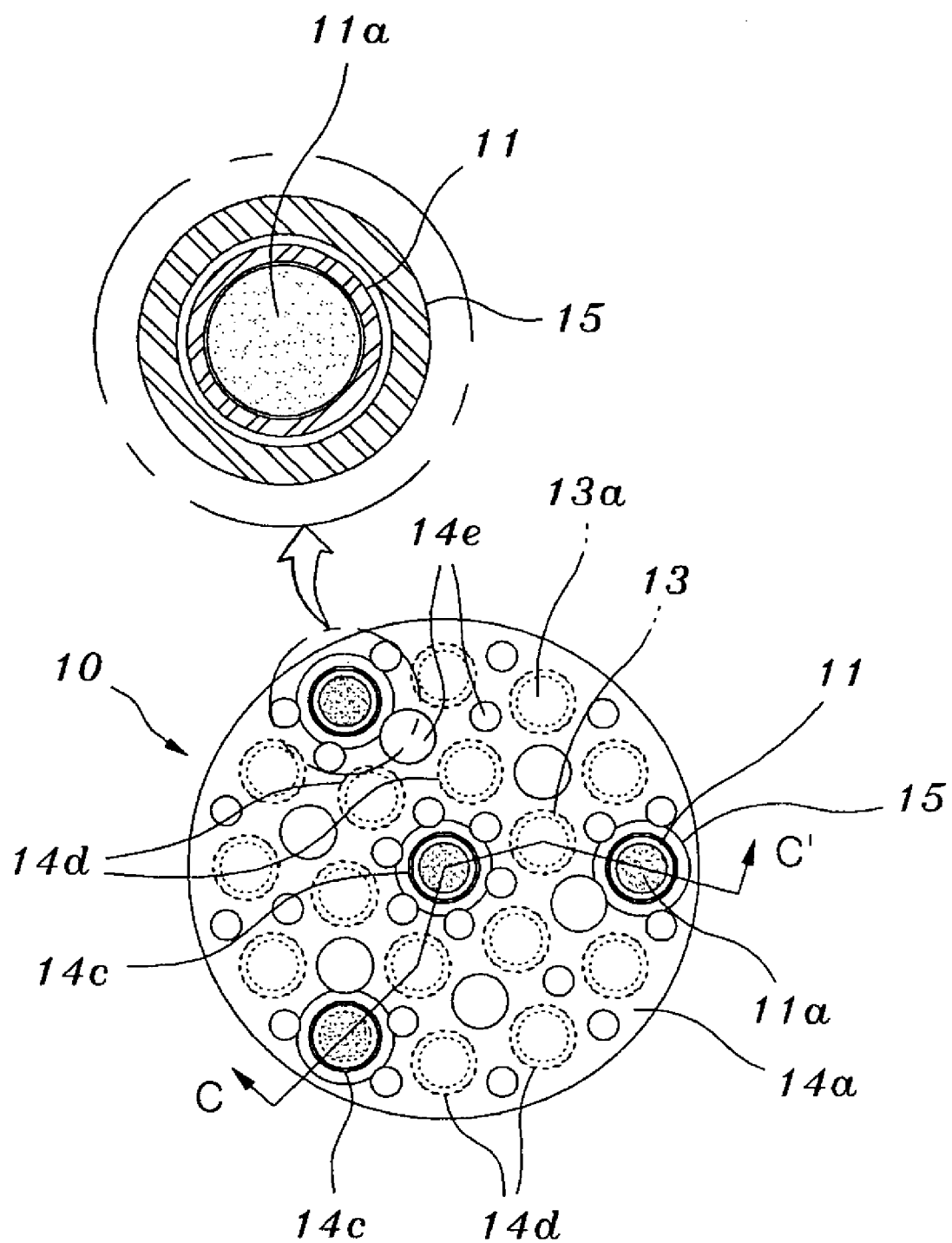
FIG. 4 is a schematic plan view illustrating a bunch of magnets used in the apparatus for producing magnetized water, according to the present invention.
Figure 5:
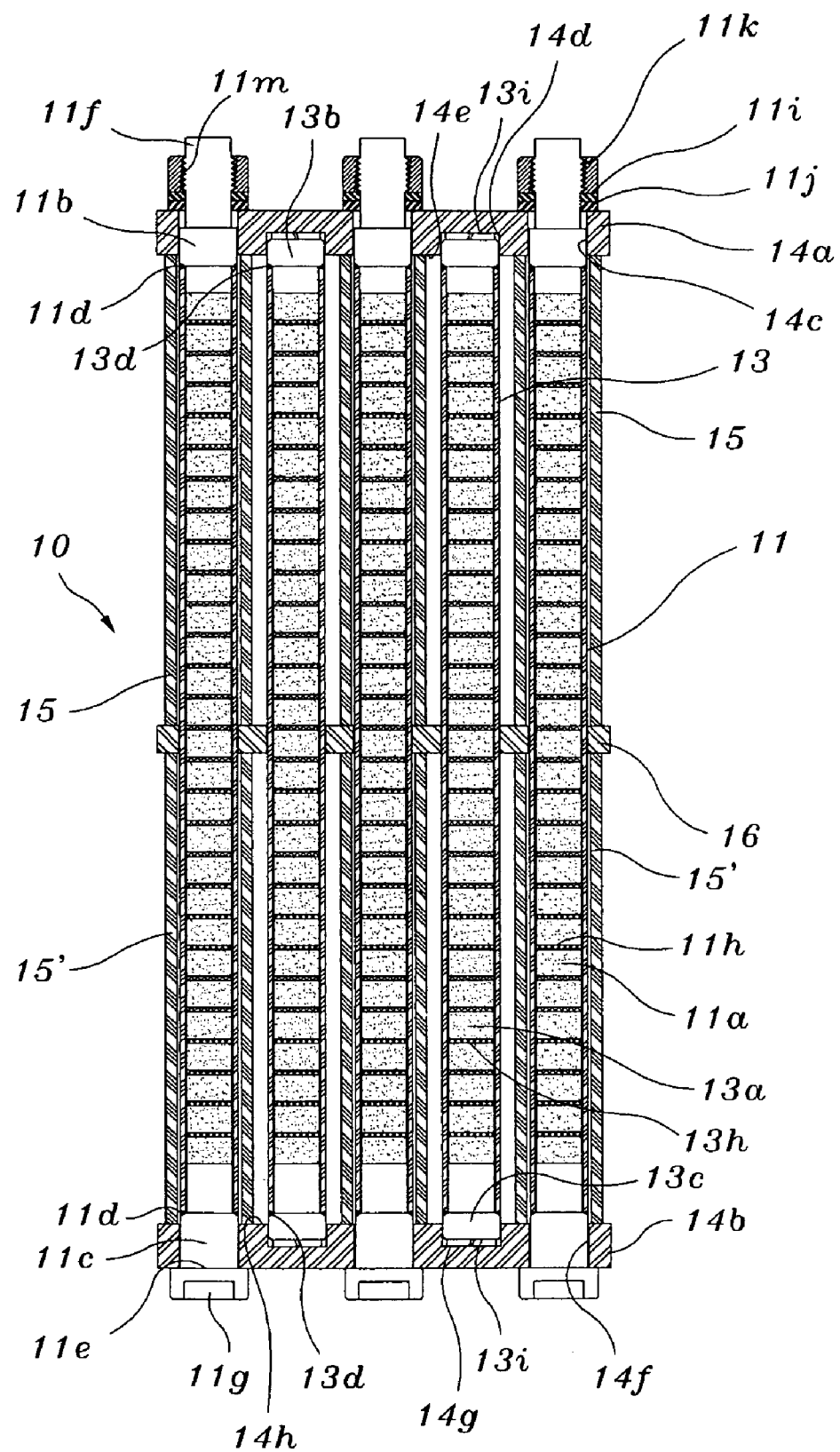
FIG. 5 is a sectional view taken along the line C-C' in FIG. 4.
Figure 6:
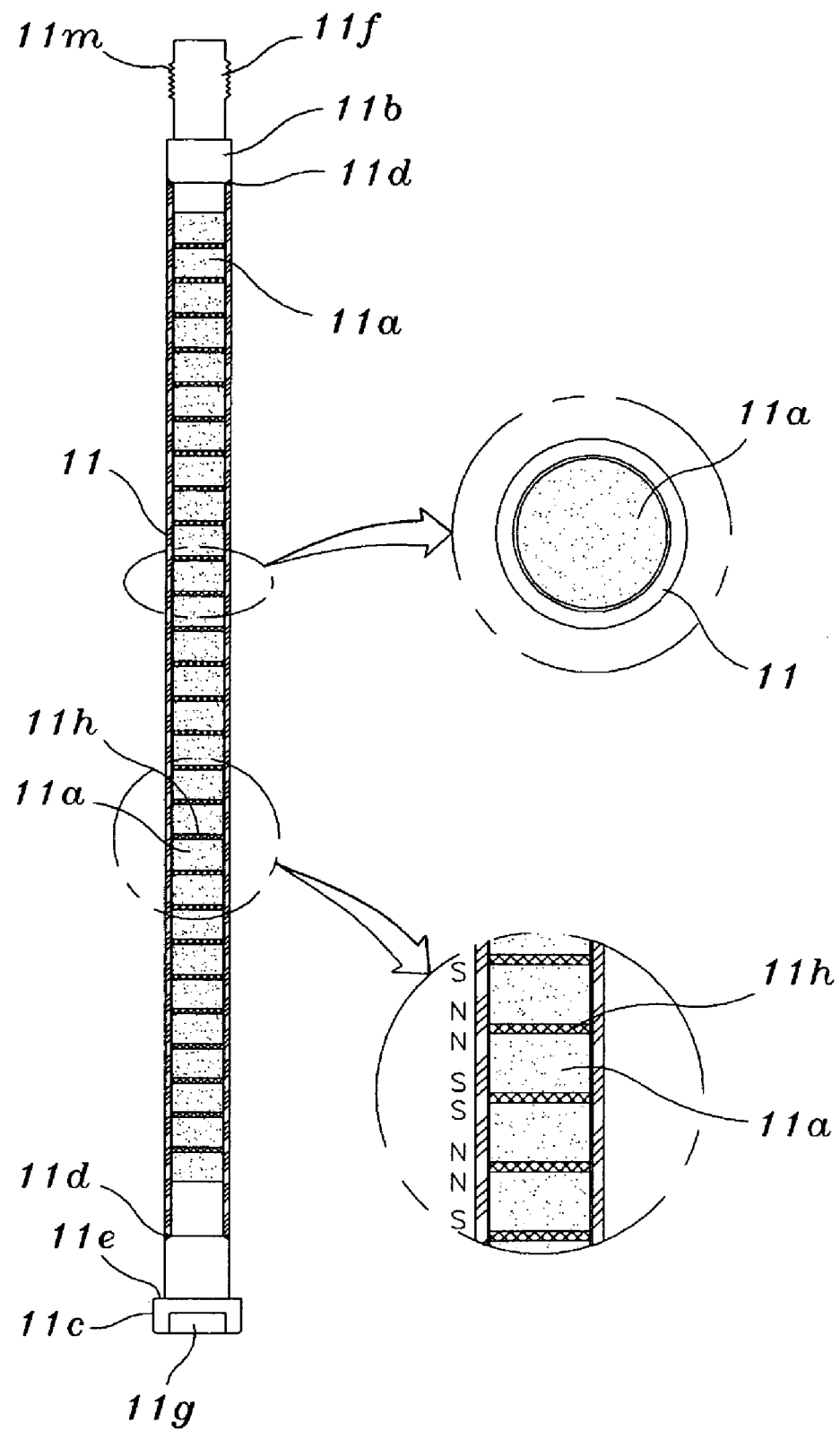
FIG. 6 is a schematic view illustrating a standard magnet bar applied to the bunch of magnets used in the apparatus for producing magnetized water, according to the present invention.
Figure 7:
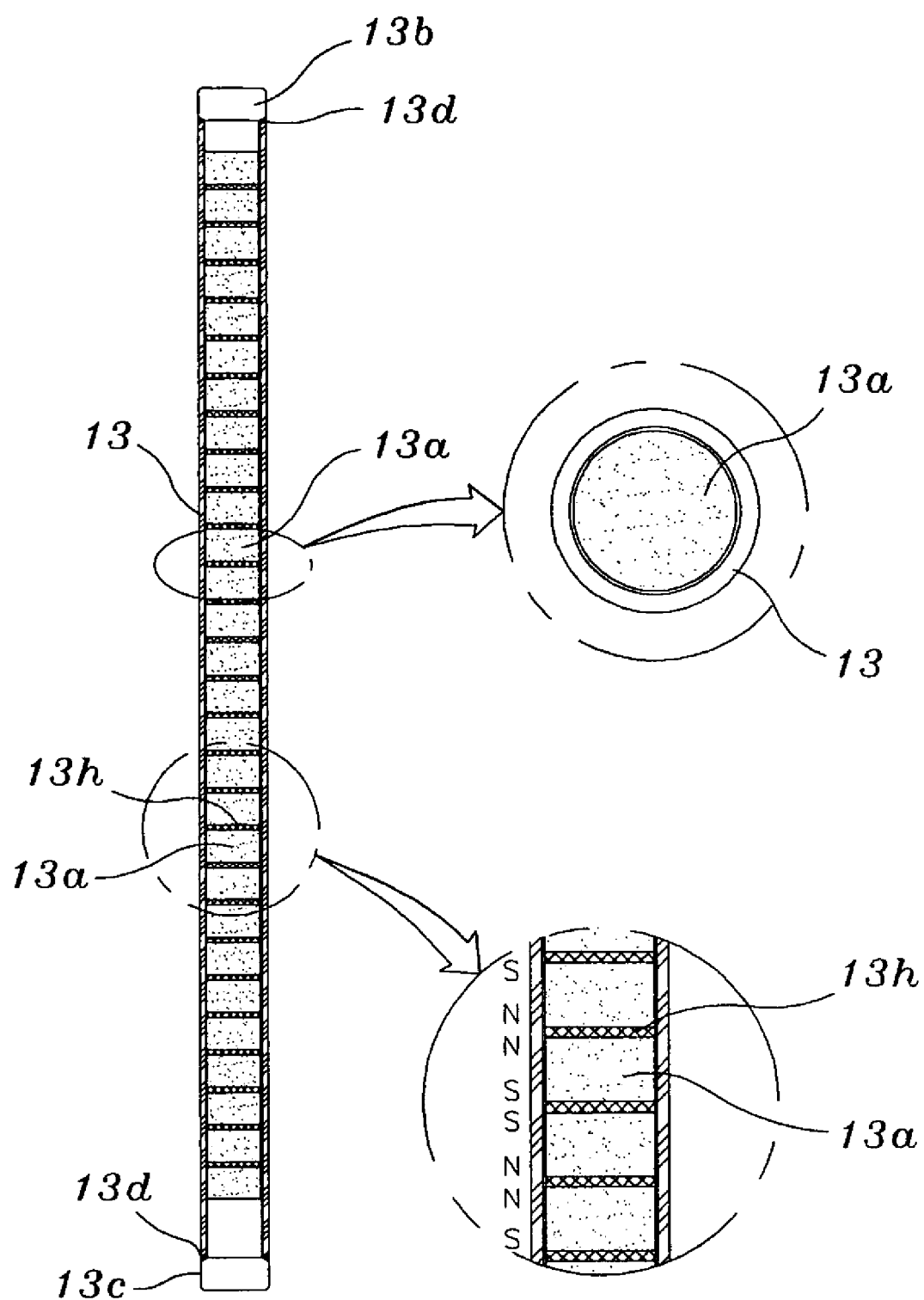
FIG. 7 is a sectional view illustrating a standard magnet bar applied to the bunch of magnets used in the apparatus for producing magnetized water, according to the present invention.
Figure 8:
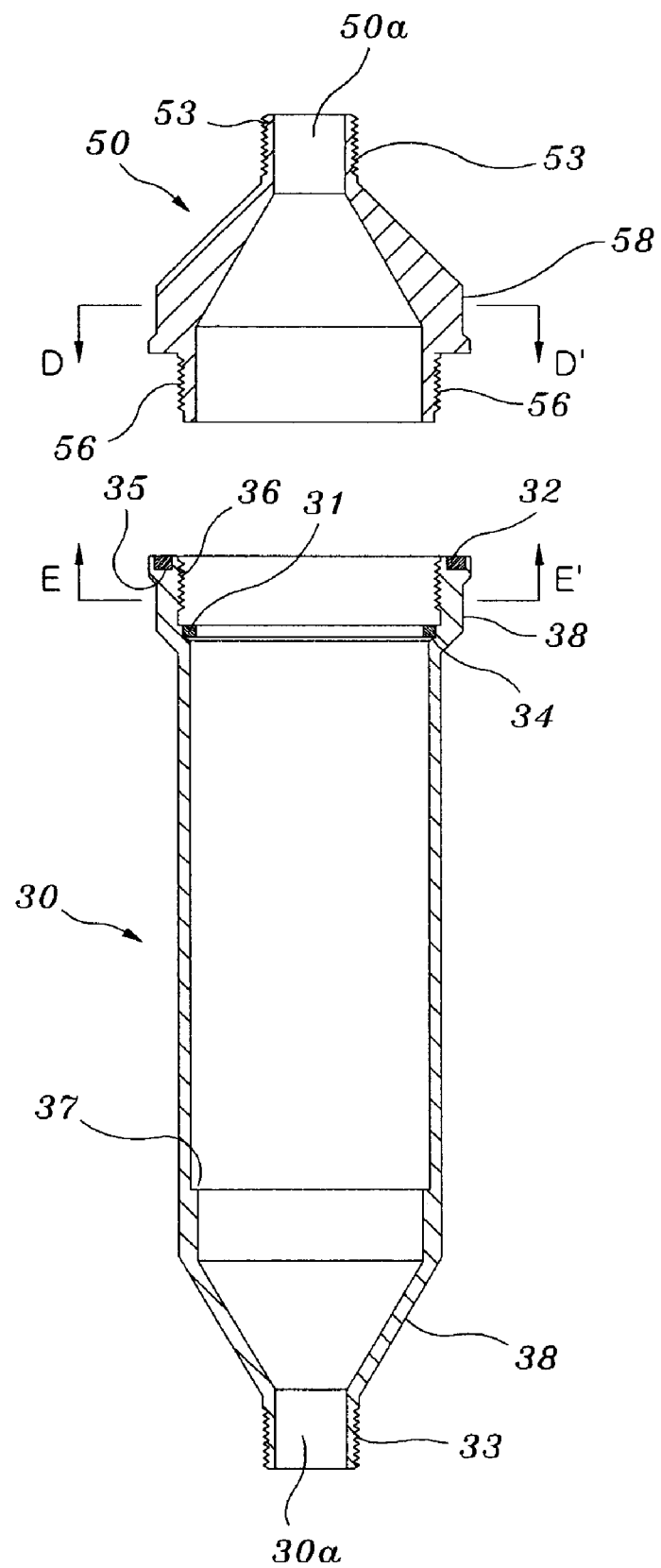
FIG. 8 is a schematic sectional view illustrating a housing and a cover of an apparatus for producing magnetized water.
Figure 9:
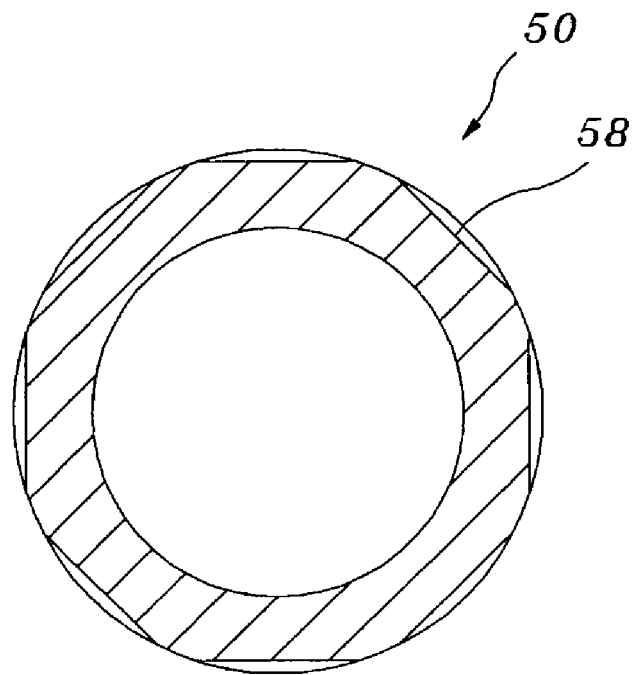
FIG. 9 is a sectional view taken along the line D-D' in FIG. 8.
Figure 10:
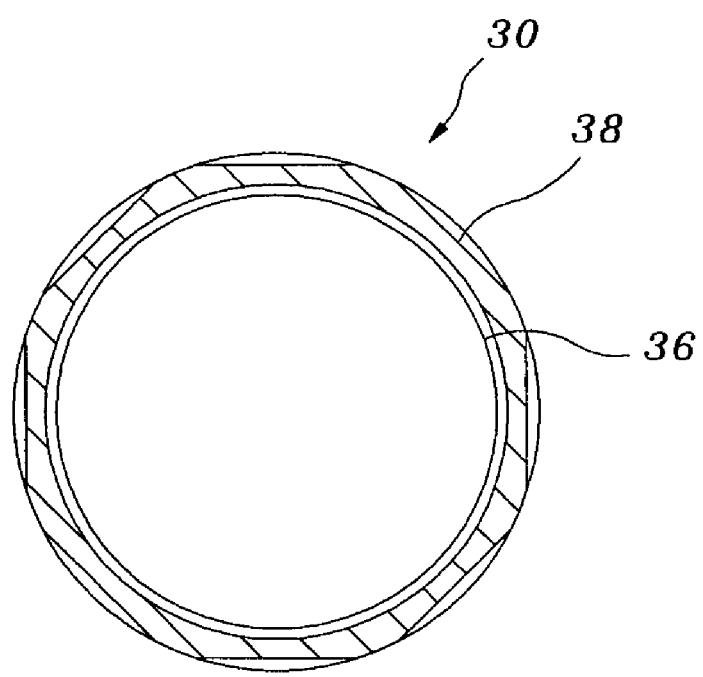
FIG. 10 is a sectional view taken along the line E-E' in FIG. 8.

Advantages and features of the present invention and methods of accomplishing the same may be understood more readily with reference to the following detailed description of preferred embodiments and the accompanying drawings. FIG. 1 is a schematic view illustrating an apparatus for producing magnetized water, according to one embodiment of the present invention, FIG. 2 is a sectional view taken along the line A-A' shown in FIG. 1, FIG. 3 is a sectional view taken along the line B-B' in FIG. 1, FIG. 4 is a schematic plan view illustrating a bunch of magnets used in the apparatus for producing magnetized water, according to the present invention, FIG. 5 is a sectional view taken along the line C-C' in FIG. 4, FIG. 6 is a schematic view illustrating a standard magnet bar applied to the bunch of magnets used in the apparatus for producing magnetized water, according to the present invention, FIG. 7 is a sectional view illustrating a standard magnet bar applied to the bunch of the magnets used in the apparatus for producing magnetized water, according to the present invention, FIG. 8 is a schematic sectional view illustrating a housing and a cover of an apparatus for producing magnetized water, FIG. 9 is a sectional view taken along the line D-D' in FIG. 8, and FIG. 10 is a sectional view taken along the line E-E' in FIG. 8.

As illustrated in the accompanying drawings, the magnetized water production apparatus 1 according to the present invention comprises a magnet bunch 10, a housing 30 and a cover 50.

The magnet bunch 10 comprises a plurality of fixed magnet bars 11, a plurality of standard magnet bars 13, an upper plate 14a and a lower plate 14b disposed at an upper end and a lower end of the magnets 11 and 13. Each of the fixed magnet bars 11s and the standard magnet bars 13a comprises a plurality of permanent magnets 11a and 13a, each having a pallet shape, arranged and stacked in a manner such that the same poles thereof face each other.

That is, the magnet bunch 10 is an aggregation of magnet pellets. In each of the fixed magnet bars 11 and the standard magnet bars 13, an N pole of a permanent magnet face an N pole of a different permanent magnet, and an S pole of a permanent magnet face an S pole of a different permanent magnet. The magnet bars 11 and 13 are arranged in a radial manner. The upper plate 14a is disposed at upper ends of the fixed and standard magnet bars 11 and 13, and the lower plate 14b is disposed at lower ends of the fixed and standard magnet bars 11 and 13.

Each of the fixed and standard magnet bars 11 and 13 comprises a cylindrical body having a space therein, and an upper and a lower cover 11b, 13b attached to an upper end and a lower end of the cylindrical body, respectively.

In order to prevent liquid from leaking into the magnet bars 11 and 13, the magnet bars 11 and 13 are sealed with welding parts 11d and 13d. That is, the upper and lower covers 11b and 13b are welded at upper and lower ends of the fixed and standard magnet bars 11 and 13.

The upper cover 11b attached to the upper end of the fixed magnet bar 11 has a key protrusion 11f, and the lower cover 11c attached to the lower end of the fixed magnet bar 11 has a key groove 11g. The magnet bunches 10, each comprising a plurality of fixed magnet bars 11 and a plurality of standard magnet bars 13, can be stacked in the vertical direction. When stacking the magnet bunches 10, the key protrusion 11f of the upper cover 11b of a lower magnet bar is engaged with the key groove 11g of the lower cover 11c of an upper magnet bar.

That is, thanks to the key protrusion 11f and the key groove 11g of the upper and lower covers 11b and 11c of the fixed magnet bar 11, two or more magnet bunches 10, each comprising a plurality of fixed and standard magnet bars 11 and 13, can be connected and stacked in series. Further thanks to the key protrusion 11f and the key groove 11g, wobbling of two or more magnet bars 10 which are stacked can be prevented.

Here, ten or more permanent magnets 11a and 13a are stacked and arranged in the corresponding fixed and standard magnet bars 11 and 13. The permanent magnets 11a and 13a are made of cobalt/nickel-based neodymium, having magnetic force between 5,000 and 10,000 G.

Gap areas between adjacent permanent magnets 11a and 13a, and magnetic force are maximized by decreasing the widths of the gaps. In order to minimize the length of permanent magnets 11a and 13a having low magnetic force, each of the permanent magnets 11a and 13a stacked in each of the magnet bars 11 and 13 is 5 to 10 millimeters long, and each magnet bar 11 or 13 comprises ten to twenty permanent magnets.

On the other hand, at every interfaces between the adjacent permanent magnets 11a or the adjacent permanent magnets 13a, in which the permanent magnets have a pellet shape and are arranged in each of the fixed and standard magnet bars 11 and 13 in a stacked manner, a magnet spacing plate 11h or 13h is disposed in order to minimize the length of a gap formed at the interface between the adjacent permanent magnets 11a or the adjacent permanent magnets 13a.

Here, a plurality of fixed magnet bars 11 and a plurality of standard magnet bars 13 have upper circular plates 14a and lower circular plates 14b at their upper and lower ends, respectively. Each of the upper and lower plates 14a and 14b has installation holes 14c and 14f, respectively, so that the fixed magnet bars 11 can be installed in a manner that both ends of each of the fixed magnet bars 11 are inserted into the installation holes 14c and 14f of the upper and lower plates 14a and 14b, respectively. The upper plate 14a and the lower plate 14b have liquid passing holes 14e and 14h, respectively.

The key protrusion 11f of the upper cover 11b exposed through the installation hole 14c of the upper plate 14a has a flat washer 11j, a spring washer 11i and a hexagonal nut 11k for fixing the fixed magnet bar 11.

As described above, the fixed magnet bar 11 is fixed to the upper plate 14a by the flat washer 11j, the spring washer 11i and the hexagonal nut 11k sequentially combined with the key protrusion 11f of the upper cover 11b.

On the other hand, the lower cover 11e provided on the lower end of the fixed magnet bar 11 has an end protrusion which is bigger than the diameter of the installation hole 14f of the lower plate 14b, and the key protrusion 11f of the upper cover 14a of the fixed magnet bar 11 has a threaded portion 11m on a circumferential outer surface thereof. That is, the lower cover 11c attached to the lower end of the fixed magnet bar 11, which is fixed in the installation hole 14f of the lower plate 14b, has a lower protrusion 11e, and the key protrusion 11f of the upper cover 11b of the fixed magnet bar 11, fixed in the installation hole 14c of the upper plate 14a, has a threaded portion 11m on its circumferential outer surface. Accordingly, when attaching the upper and lower plates 14a and 14b to the upper and lower ends of the fixed magnet bar 11, the lower protrusion 11e supports the lower plate 14b, and a hexagonal nut 11k is screwed to the threaded portion 11m of the key protrusion 11f of the upper cover 11b.

Thanks to this structure, the coupling and fixing force of the fixed magnet bars 11 combined with the upper and lower plates 14a and 14b is enhanced.

Further, the upper plate 14a has installation grooves 14d formed on a surface thereof at regular intervals, and the lower plate 14b has installation grooves 14g formed on a surface thereof at regular intervals, so that the standard magnet bars 14 are installed in a manner such that both ends of each of the standard magnet bars 14 are disposed in the installation grooves 14d and 14g of the upper and lower plates 14a and 14b, respectively. That is, the upper plate 14a and the lower plate 14b have the respective installation grooves 14d and 14g, for fixing the standard magnet bars 13.

Further, a spring washer 13i is provided to an end of the standard magnet bar 13 in order to protect the standard magnet bar 13 fixed to the upper and lower plates 14a and 14b from shocks.

A spacing plate 16 having a plurality of spacing holes 16c arranged at regular intervals and having a circular shape is provided in the middle portion, in the length direction, of the magnet bunch 10 comprising a plurality of standard magnet bars 13 and a plurality of fixed magnet bars 11. The spacing holes 16c have diameters corresponding to sectional sizes of the fixed and standard magnet bars 11 and 13 so that the fixed and standard magnet bars 11 and 13 are installed by being inserted through the holes 16c.

Thanks to the spacing plate 16 provided at an appropriate position on the magnet bunch 10, the gap between the fixed magnet bar 11 and the standard magnet bar 13 is kept constant, thereby applying uniform magnetic force to the flowing liquid.

Spacing pipes 15 and 15' are provided around the fixed magnet bars 11, and serve to maintain constant distance between the fixed magnet bars 11 and the standard magnets 13. The spacing pipes 15 and 15' further serve to fix the position of the spacing plate 16 so that the ends of the fixed magnet bars 11 and the standard magnet bars 13 are positioned on the upper surface and the lower surface of the spacing plate 16.

That is, the spacing pipes 15 and 15' are provided to surround the fixed magnet bars 11 in a manner such that the spacing plate 16 is positioned between the spacing pipe 15 and the spacing pipe 15'. Accordingly, the position of the spacing plate 16 installed in the middle portion, in the length direction, of the fixed magnet bar 11 and the standard magnet bar 13 is fixed.

Additionally, the spacing plate 16 has a liquid passing hole 16a which is a through hole and through which liquid passes.

As described above, since a plurality of fixed magnet bars 11 and a plurality of standard magnet bars 13 are securely assembled and fixed thanks to the upper and lower plates 14a and 14b provided at upper and lower ends of the fixed magnet bars 11 and the standard magnet bars, and the spacing plate 16 provided at a proper position in the middle portion, in the length direction, of the fixed magnet bar 11 and the standard magnet bar 13, the fixed magnet bar 11 and the standard magnet bar 13 are prevented from vibration and wear due to flow of the liquid.

Here, the upper plate 14a and the lower plate 14b have an installation hole 14c and an installation hole 14f, respectively, in center portions thereof. Further, three installation holes 14c are formed around the central installation hole 14c of the upper plate 14a, and three installation holes 14f are formed around the central installation hole 14f of the lower plate 14b. Further, along the circumferential edge of the upper plate 14a, six installation grooves 14d are formed, and nine installation grooves 14d are formed near the six installation grooves 14d. Further, six installation grooves 14g are formed along the circumferential edge of the lower plate 14b, and nine installation grooves 14g are formed near the six installation grooves 14g.

That is, one fixed magnet bar 11 is installed between the upper and lower plates 14a and 14b at the center portion of the plates 14a and 14b, and three fixed magnet bars 11 are installed in a radial manner around the one fixed magnet bar 11 installed at the center portion. Further, six standard magnet bars 13 are installed on additional outer sides of the three fixed magnet bars 11 in a radial manner, and nine standard magnet are arranged in a radial manner on additional outer sides of the six standard magnet bars 13 between the upper plate 14a and the lower plate 14b.

Here, the upper plate 14a and the lower plate 14b have three corresponding installation holes 14c and 14f, and nine corresponding installation grooves 14d and 14g. The upper plate 14a and the lower plate 14b have a plurality of liquid passing holes 14e and 14h formed at regular intervals at proper positions thereof.

Figure 11:
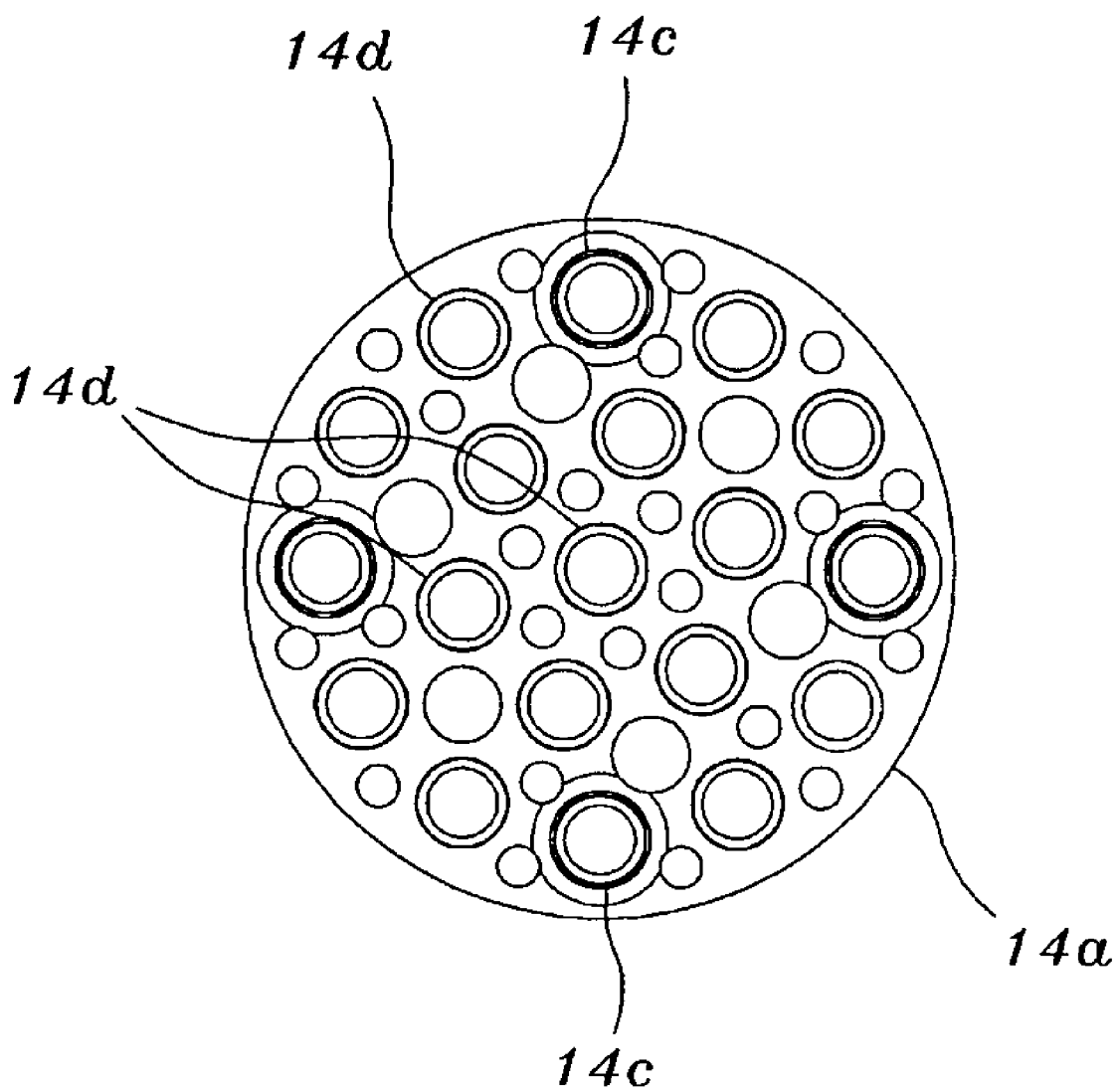
FIG. 11 is a schematic plan view illustrating a magnetized water production apparatus according to a first embodiment of the present invention.

As described above, according to one embodiment of the present invention, the upper plate 14a and the lower plate 14b have installation through holes 14c and 14f, respectively, at center portions thereof, and have three installation through holes 14c and three installation through holes 14f around the one installation through hole 14c formed in the center portion of the upper plate 14a and the one installation through hole 14f in the center portion of the lower plate 14b, respectively. Further, the upper plate 14a has six installation grooves 14d around the three installation holes 14c, and nine installation grooves 14d around the six installation grooves 14d. The lower plate 14b has six installation grooves 14g around the three installation holes 14c, and has nine installation grooves 14g around the six installation grooves 14g. However, referring to FIG. 11, the upper plate 14a can have an installation groove 14d in a center portion thereof, six installation grooves 14d around the center installation groove 14d, arranged in a radial manner, eight installation grooves 14d near the six installation grooves 14d, and four installation holes 14c, which are through holes, in the edge portion of thereof; and the lower plate 14b can have an installation groove 14g in a center portion thereof, six installation grooves 14g around the center installation groove 14c, eight installation grooves 14g near the six installation grooves 14g, and four installation holes 14f, which are through holes, near the edge portion thereof. Here, the lower plate 14b arranged below the upper plate 14a is formed facing with the upper plate 14a.

According to the one embodiment of the present invention, the fixed magnet bars 10 and the standard magnet bars 13 constituting the magnet bunch 10, the installation holes 14c and 14f, the installation grooves 14d and 14g, and the liquid passing holes 14e and 14h of the upper plate 14a and the lower plate 14b are arranged at regular intervals, but the present invention is not limited thereto. That is, the magnet bars 11 and 13 of the magnet bunch 10, the installation holes 14c and 14f, the installation grooves 14d and 14g, and the liquid passing holes 14e and 14h of the upper plate 14a and the lower plate 14b to which the magnets 11 and 13 are installed can be arranged at irregular intervals and in an irregular manner as long as the magnetic force generated by the permanent magnets 11a and 13a stacked in the magnet bars 11 and 13 is maximized.

Here, the spacing plate 16 and the spacing holes 16c between the upper plate 14a and the lower plate 14b are arranged to correspond to the arrangement of the upper plate 14a and the lower plate 14b. The liquid passing holes 14e, 14h and 16a formed to penetrate the upper and lower plates 14a and 14b and the spacing plate 16 have different diameters.

According to the one embodiment of the present invention, the diameters of the upper and lower plates 14a and 14b and the spacing plate 16 are different, but the upper and lower plates 14a and 14b and the spacing plate 16 can have the same diameters.

As described above, the installation holes 14c and 14f, the installation grooves 14d and 14g, and the liquid passing holes 14e and 14h formed in the upper and lower plates 14a and 14b, and the spacing holes 16c formed in the spacing plate 16 are spaced apart from each other by a predetermined distance, so that the fixed magnet bars 11 and the standard magnet bars 13 are densely assembled at a uniform distance. Accordingly, liquid passing through the magnetized water can be exposed to a uniform magnetic force.

The housing 30 has a hollowed cylindrical shape in order to receive the magnet bunch 10 therein, and is opened at an upper end. An inner O-ring 31 and an inner O-ring contact part are provided to the inner circumferential surface of the hollowed cylinder at an upper end portion thereof, and an outer O-ring 32 and an outer O-ring contact part are provided to the outer circumferential surface of the cylinder at the upper end portion.

The lower end portion of the housing 30 has a funnel shape. That is, the diameter of the lower end portion of the housing 30 becomes smaller toward the lower end, and has a liquid passage 30a having a predetermined diameter. Thanks to the outer O-ring 32, the housing 30 can be securely sealed, and the sealed state is maintained. Further, thanks to the inner O-ring 31, shaking and vibration of the magnet bunch 10 can be prevented. That is, since the inner O-ring 31 is in contact with the upper portion of the magnet bunch 10 received in the housing 30, it is possible to prevent the magnet bunch 10 from shaking and vibrations that occur due to the flow of liquid, and to ensure a secure seal between the housing 30 and the cover 50. The outer O-ring 32 serves to ensure a final seal between the housing 30 and the cover 50.

Further, a supporting sill 37 is formed on and along the inner circumferential surface of the housing 30 to support the magnet bunch 10.

The cover 50 is detachably combined with an opened upper end portion of the housing 30, and has a funnel shape the diameter of which decreases moving upward. The cover 50 has a liquid passage 50a having a predetermined diameter.

The housing 30 and the cover 50 are preferably made of stainless steel, but also can be made of synthetic resin or other materials if the synthetic resin or other materials can ensure the same function and have the same structure as the stainless steel housing and cover with reduced weight.

Further, a coupling screw 33 is provided at a lower end portion and around the circumferential outer surface of the housing 30, and a coupling screw 53 is provided at an upper end portion and around the circumferential outer surface of the cover 50. Further, a coupling screw 36 is provided at an upper end portion and around the outer circumferential surface of the housing 30, and a coupling screw 56 is provided at a lower end portion and around the circumferential outer surface of the cover 50.

That is, the coupling screws 33 and 53 are provided to the circumferential outer surface at the lower end portion of the housing 30 and to the circumferential outer surface at the upper end portion of the cover 50, respectively, so that the housing 30 and the cover 50 can be connected to a tap water pipe or to a liquid pipe. Further, a threaded portion 36 and a threaded portion 56 are provided to the circumferential inner surface at an upper end portion of the housing 30, and to the circumferential outer surface at a lower end portion of the cover 50, respectively, for coupling between the housing 30 and the cover 50 by a screwing method.

Further, the housing 30 and the cover 50 have octagonal portions 38 and 58 on their respective outer surfaces in order to allow the housing 30 and the cover 50 to be screwed and unscrewed for coupling and decoupling therebetween without using additional tools.

As described above, by maintaining uniform distance between the fixed magnet bar 11 and the standard magnet bar 13 having permanent magnets 11a or 13a, each having a pellet shape, and combining many fixed magnet bars 11 and the standard magnet bars 13 into a magnet bunch inside the housing 30 and the cover 50, it is possible to increase the contact area between liquid and a magnetic field coming out from the magnet bars 11 and 13 and to allow liquid passing through the magnet bars 11 and 13 to receive uniform magnetic force generated by repulsive force formed at interfaces between the adjacent permanent magnets 11a and 13a, resulting in magnetization of the liquid.

For these reasons, elements constituting the magnet bunch including the fixed magnet bars 11 and the standard magnet bars 13 are preferably made of stainless steel that can shield magnetic force, but the present invention is not limited thereto. That is, the elements can also be made of synthetic resin or other materials if the synthetic resin or other materials can help maximize the magnetic force generated between the permanent magnets 11a and 13a arranged in a manner such that like poles thereof face each other, and can allow uniform magnetic force to be transferred to the liquid flowing between the fixed and standard magnet bars 11 and 13.

Further, according to the embodiment of the present invention, the magnet bunch 10 has a cylinder shape as overall. That is, the housing 30 for enclosing the magnet bunch 10 therein and the cover 50 has a cylinder shape or a shape of similar to a cylinder. However, the magnet bunch 10 and the housing 30 for enclosing the magnet bunch 10 therein can have an octagonal prism shape, a triangular prism shape, a quadrangular prism shape, or an elliptic cylinder shape.

The number of the magnet bars 11 and 13 in the magnet bunch 10 enclosed in the housing 30 is adjusted such that the total area of the liquid passing holes 14e, 14h and 16a of the magnet bunch 10 is almost the same as the area of the liquid passage 30a formed at an end portion of the cover 50. The permanent magnets 11a and 13a arranged in a stacked manner in each of the magnet bars 11 and 13 are arranged such that like poles thereof face each other with minimum distance therebetween, thereby increasing repulsive magnetic force generated at the interface between the adjacent permanent magnets 11a and 13a, and generating the magnetic force in the direction perpendicular to the flow of liquid flowing through the magnet bunch 10 in order to apply uniform magnetic force to the liquid.

The elements 10, 30 and 50 constituting the magnetized water production apparatus 1 are assembled so as to be capable of being disassembled. Accordingly, the magnetized water production apparatus according to the present invention can be easily repaired and maintained.

Hereinafter, methods of assembling and installing the magnetized water production apparatus 1 will be described below.

First, the permanent magnets 11a and 13a, each having a pellet shape, are arranged in a stacked manner in the corresponding fixed magnet bar 11 and the corresponding standard magnet bar 13 in a manner such that an N pole of one permanent magnet faces an N pole of an adjacent permanent magnet, and an S pole of one permanent magnet faces an S pole of an adjacent permanent magnet.

In this instance, when stacking the permanent magnets 11a and 13a, a magnet spacing plate 11h or 13h is disposed between adjacent permanent magnets 11a or 13a in order to reduce the size of a gap between adjacent permanent magnets 11a or 13a.

After the permanent magnets 11a and 13a are stacked in the corresponding fixed magnet bar 11 and the corresponding standard magnet bar 13, the upper covers 11b and 13b and the lower covers 11c and 13c are welded to upper end portions and lower end portions of the fixed and standard magnet bars 11 and 13, respectively, forming welding parts 11d and 13d, respectively, so that the fixed and standard magnet bars 11 and 13 are sealed.

After preparation of the fixed and standard magnet bars 11 and 13 is completed, the fixed magnet bars 11 are inserted into the installation holes 14c formed in the lower plate 14b. In this instance, the lower plate 14b is positioned at the appropriate position of the fixed magnet bar 11 by the lower cover 11c provided to the lower end portion of the fixed magnet bar 11.

Next, the spacing pipe 15 is combined with the fixed magnet bar 11 by insertion, and then the spacing plate 16 is installed. Next, another spacing pipe 15' is installed. In this instance, the fixed magnet bars 11 are inserted into the spacing holes 16c of the spacing plate 16.

Next, the standard magnet bars 13 are inserted into the spacing holes 16c of the spacing plate 16, and the upper plate 14a having the installation holes 14c and the installation grooves 14d are combined to upper end portions of the fixed and standard magnets bars 11 and 13.

Here, one fixed magnet bar 11 is installed at center portions of the upper and lower plates 14a and 14b between the upper and lower plates 14a and 14b by insertion, and three different fixed magnet bars 11 are installed around the centrally positioned fixed magnet bar 11. Further, six standard magnet bars 13 are installed on outer sides of the three fixed magnet bars 11 in a radial manner and nine standard magnet bars 13 are disposed near the edge of the upper and lower plates 14a and 14b and near the six standard magnet bars 13.

When installing the fixed and standard magnet bars 11 and 13, upper and lower ends of the standard magnet bars 13 are disposed in the installation grooves 14d and 14g formed in the upper and lower plates 14a and 14b via respective spring washers 13i.

After installing the upper plate 12a on the fixed and standard magnet bars 11 and 13, a flat washer 11j and a spring washer 11i are combined with the key protrusion 11f of the upper cover 11b of the fixed magnet bar, exposed through the installation hole 14c of the upper plate 14a. Next, a hexagonal nut 11k is screwed to a bolt 11m formed on the outer surface of the key 11f, thereby completing assembly of the magnet bunch 10.

Here, the fixed magnet bars 11 installed in the magnet bunch 10 further serves to further fix the magnet bunch 10.

Next, the magnet bunch 10 is inserted in the housing 30, and the housing and the cover 50 are coupled by female and male screws 36 and 56, thereby completing assembly of the magnetized water production apparatus according to the present invention.

In this instance, the lower plate 14b of the magnet bunch 10 enclosed in the housing 30 is placed on the supporting sill 37 formed on and along the circumferential inner surface of the housing 30, and the upper plate 14a abuts the inner O-ring 31 provided to the circumferential inner surface of the housing 30, so that the magnet bunch 10 is fixed in the housing 30.

Hereinafter, a method of producing magnetized water using the magnetized water production apparatus 1 according to the present invention will be described.

The magnetized water production apparatus 1 prepared through the above described method is coupled to a tap water pipe. At this time, water is introduced into the apparatus 1 through the liquid passage 50a formed in the cover 50, is magnetized in the apparatus 1 while passing through the magnet bunch 10 enclosed in the housing 30, and is then discharged through the liquid passage 30a formed in the housing 30.

The water passing through the magnet bunch 10 is introduced through the liquid passing holes 14e that have different diameters and are through holes formed so as to penetrate the upper plate 14, and is magnetized by being brought into contact with a magnetic field generated from the interface between the adjacent permanent magnet bars 11a or 13a which are arranged in the magnet bars 11 and 13 in a manner that like poles face each other.

That is, the water flowing through the magnet bunch 10 is magnetized by the strong magnetic force formed by the repulsive force generated at the interfaces between the adjacent permanent magnets 11 or the adjacent permanent magnets 13 when the water flows in a direction perpendicular to the magnetic force.

The water magnetized while passing through the magnet bunch 10 is discharged through the liquid passage 30a of the housing 30 and the liquid passing holes 14h that have different diameters and are through holes formed to penetrate the lower plate 14b.

Further, the outer surfaces of the fixed magnet bars 11 and the standard magnet bars 13 are coated with natural stone, ceramic or a mixture thereof, which generate or irradiate anions and far infrared rays, for enhancing the effect of activating water passing through the magnet bunch 10.

According to the embodiment of the present invention, the outer surfaces of the fixed magnet bars 11 and the standard magnet bars 13 are coated with natural stone, ceramic or mixtures thereof to enhance the activation of water, but the present invention is not limited thereto. That is, instead of coating the outer surfaces of the magnet bars 11 and 13, the inner surfaces of the housing 30 and the cover 50 can be coated with the natural stone, ceramic or mixtures thereof that generate anions and far infrared rays.

The magnetized water production apparatus 1 can be used when directly coupled to a tap water pipe by threads 33 and 52 formed at both end portions of the apparatus 1. When the threads 33 and the 53 are structured according to standard specifications, the apparatus 1 can be fitted to a water metering system of a house or a building in order to magnetize water flowing into the household or building. The apparatus 1 according to the present invention can be applied to agricultural water and industrial water as well as to drinking water. Further, when the apparatus 1 is applied to a water supply system not connected to water works, it is possible to prevent waterborne diseases. Still further, if the apparatus 1 is applied to water works or swimming pools, it is possible to decrease the use of sodium hypochlorite and sterilizing chemicals, thereby being helpful for the prevention of skin and eye diseases.

Since the magnetized water production apparatus according to the present invention changes large clusters of water to small clusters of water, the magnetized water produced using the magnetized water production apparatus 1 has a low specific heat in the range from 25 to 30° C. That is, the magnetized water has a specific heat 5% lower than that of normal water. Accordingly, the energy required for boiling water in a household boiler or an evaporator can be reduced by 10%.

Further, when the apparatus 1 is applied to medical fields and to various vehicles, it is possible to activate blood and increase gasoline mileage. As described above, the apparatus 1 can be used in a variety of application fields.

Figure 12:
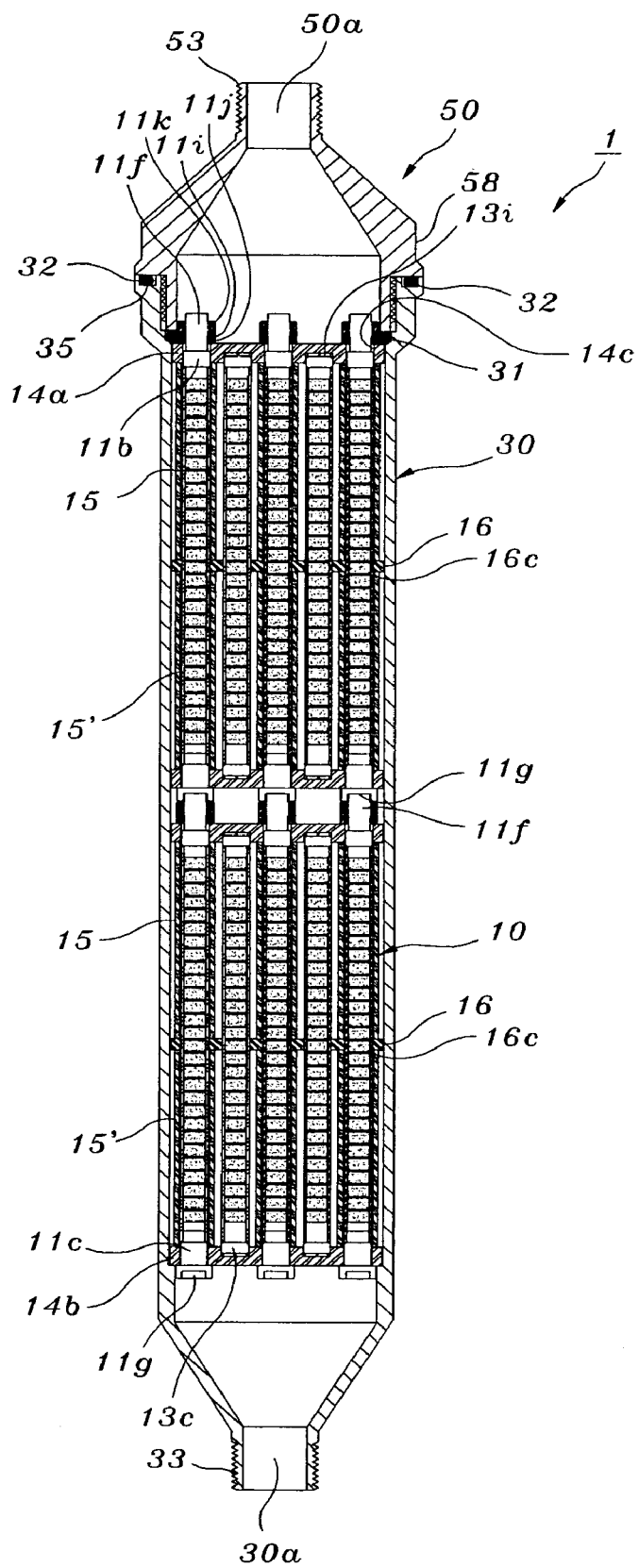
FIG. 12 is a schematic sectional view illustrating a magnetized water production apparatus according to a second embodiment of the present invention.

FIG. 12 is a schematic sectional view of a magnetized water production apparatus according to a second embodiment of the present invention, in which the number of magnet bars is different, compared to the apparatus according to the first embodiment of the present invention.

Referring to FIG. 1, FIG. 6, FIG. 7 and FIG. 8, when installing two magnet bunches 10 comprising fixed magnet bars 11, standard magnet bars 13 and upper and lower plates 14a and 14b in one housing 30, they are arranged in the housing 30 in a manner such that one magnet bunch 10 is inserted into the housing 30 first, and then a different magnet bunch 10 is stacked on top of the magnet bunch 30 previously inserted into the housing 30. The length of the housing 30 varies in proportion to the number of magnet bunches 10 to be enclosed in the housing 30.

When installing a plurality of magnet bunches 10 in a housing 30, the magnet bunches 10 are arranged in series in the housing 30.

When stacking the magnet bunches 10, the key protrusions 11f on the upper end portion of the fixed magnet bars 11, protruding through the installation through holes 14 of the upper plate 14a of a lower magnet bunch 10 in a housing 30, are inserted by being engaged with respective key grooves 11g formed on the bottom of the fixed magnet bars 11 of an upper magnet bunch 10, respectively.

As described above, many magnet bunches 10 can be stacked by inserting the key protrusions 11f of the upper fixed magnet bars 11 into key grooves 11g of the corresponding lower fixed magnet bars 11.

According to this embodiment, two magnet bunches 10 are enclosed in one housing 30, but the present invention is not limited thereto. That is, more than two magnet bunches 10 can be enclosed in one housing 30. In this instance, the housing 30 must be manufactured to have a length corresponding to the number of magnet bunches 10 to be enclosed in the housing 30.

According to this embodiment, the two magnet bunches 10 are stacked in the vertical direction, but the present invention is not limited thereto. That is, the magnet bunches 10 can be arranged in a radial manner in the housing 10 at a center portion and at peripheral portions of the housing. Further, the magnet bunches 10 can be arranged in a radial manner to form a first layer, and then the other magnet bunches 10 can be arranged in a radial manner on the magnet bunches 10 in the first layer, forming a second layer. Thanks to these structures, it is possible to apply magnetic force to water flowing in the housing 30 in order to activate the water to turn it into magnetized water. The length and diameter of the housing 10 are determined so that many magnet bunches 10 can be easily installed therein.

The magnet bunch 10, the housing 30 and the cover 50 preferably have a hexagonal prism shape.

Figure 13:
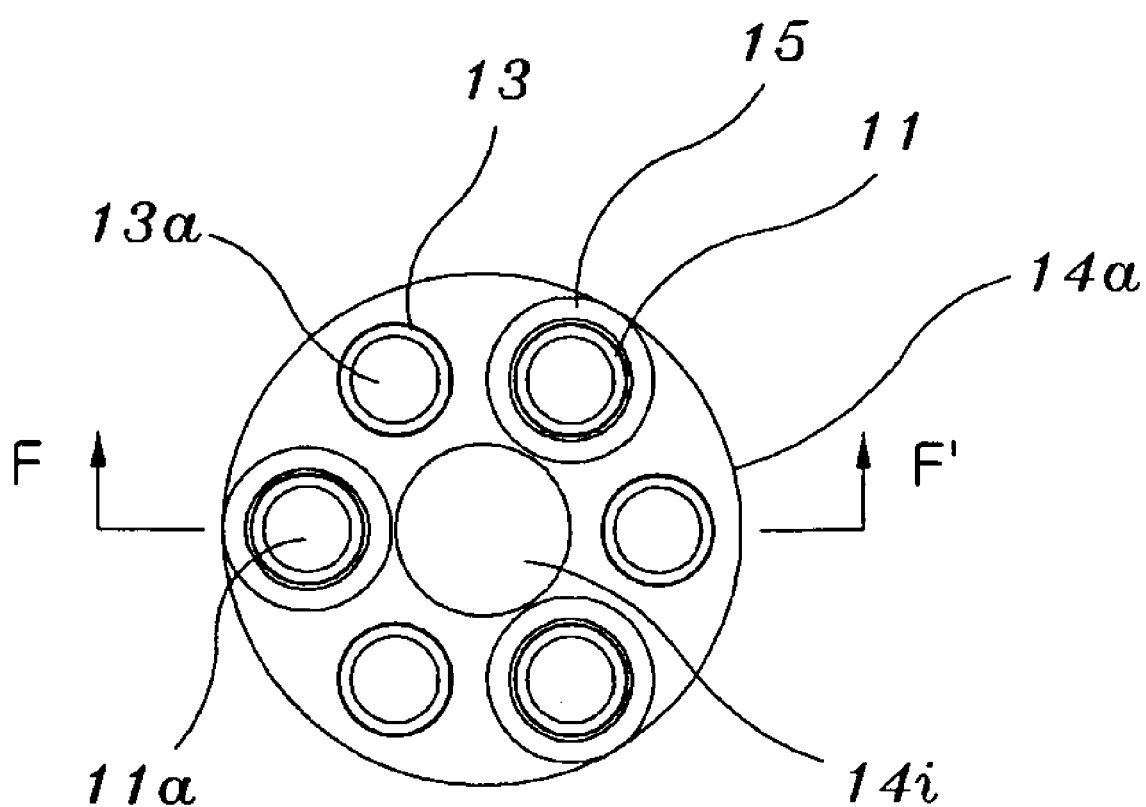
FIG. 13 is a schematic plan view illustrating a magnetized water production apparatus according to a third embodiment of the present invention.
Figure 14:
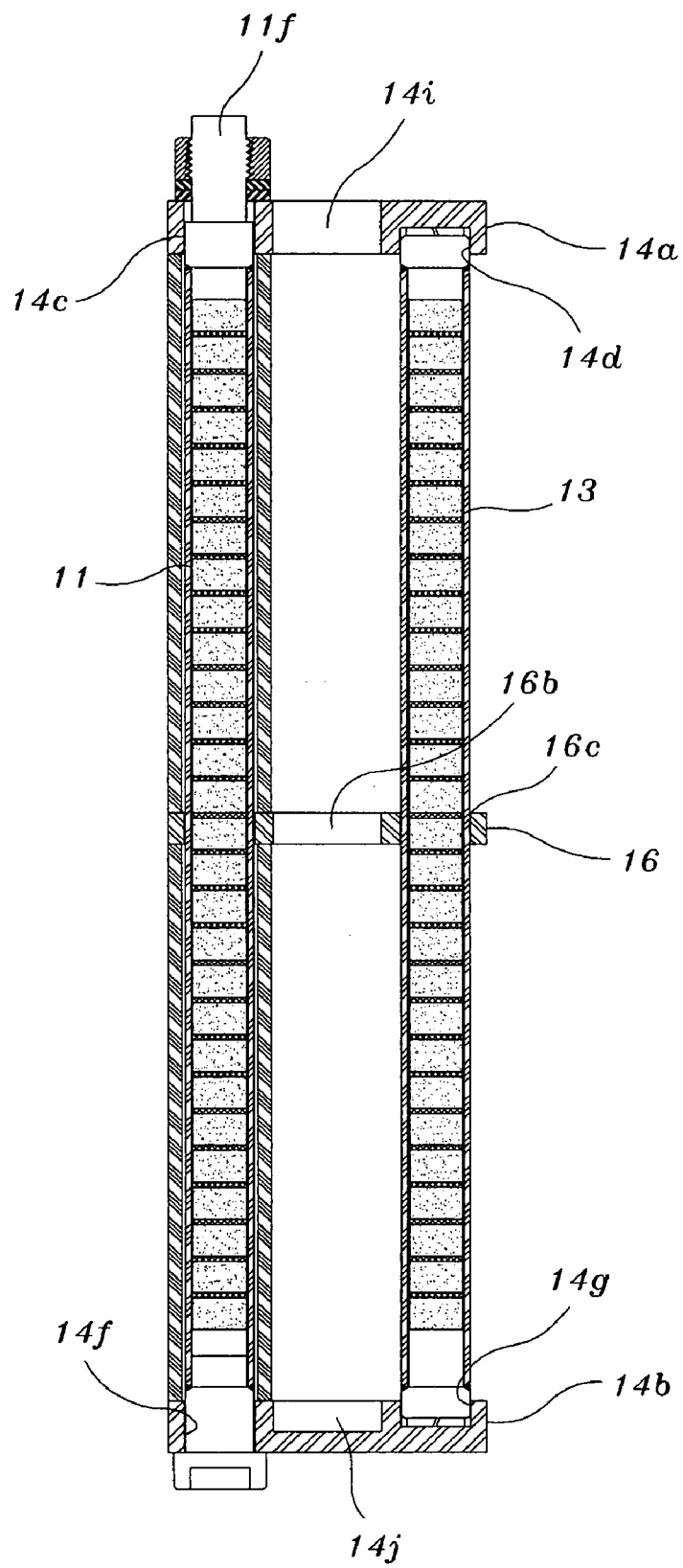
FIG. 14 is a sectional view taken along the line F-F' in FIG. 13.

FIG. 13 is a schematic plan view illustrating a magnetized water production apparatus according to a third embodiment of the present invention, and FIG. 14 is a sectional view taken along the line F-F' in FIG. 13.

Referring to FIG. 1, FIG. 6, FIG. 7 and FIG. 8, the apparatus 1 is devised to store blood in the space of the magnet bunch 10.

The upper plate 14a and the lower plate 14b have installation holes 14c and 14f and installation grooves 14d and 14g, in which the installation holes 14c and 14f and the installation grooves 14d and 14g are alternately arranged in a circumferential direction. The upper plate 14a has a central penetration hole 14i at its center and the lower plate 14b has a support 14j at its center.

A spacing plate 16 is provided in the middle of the fixed and standard magnet bars 11 and 13 disposed between the upper and lower plates 14a and 14b in the length direction. The spacing plate 16 has a central spacing hole 16b at its center and has a plurality of spacing holes 16c around the central spacing hole 16b in a radial manner. Further, the spacing plate 16 has a circular shape.

According to this embodiment, the upper plate 14a has the central hole 14i, three installation holes 14c and three installation grooves 14d around the central hole 14i, and the lower plate has the central support 14j, three installation holes 14f and three installation grooves 14g around the central support 14j, but the present invention is not limited thereto. The number of installation holes and installation grooves may vary.

Here, the diameter of the central hole 14i is determined so as to be suitable to store blood. Furthermore, a blood tube disposed in the central hole 14i and the central spacing hole 16b is supported by the central support 14j.

According to this embodiment, the apparatus 1 has the central support 14j on the lower plate 14b, but the apparatus 1 can have a central through hole in the lower plate 14b instead of the support 14j, so that a blood supply pipe may pass through the center of the apparatus 1 through the central hole 14i of the upper plate 14a and the central through hole of the lower plate 14b, and blood flowing through the blood supply pipe can be activated.

Figure 15:
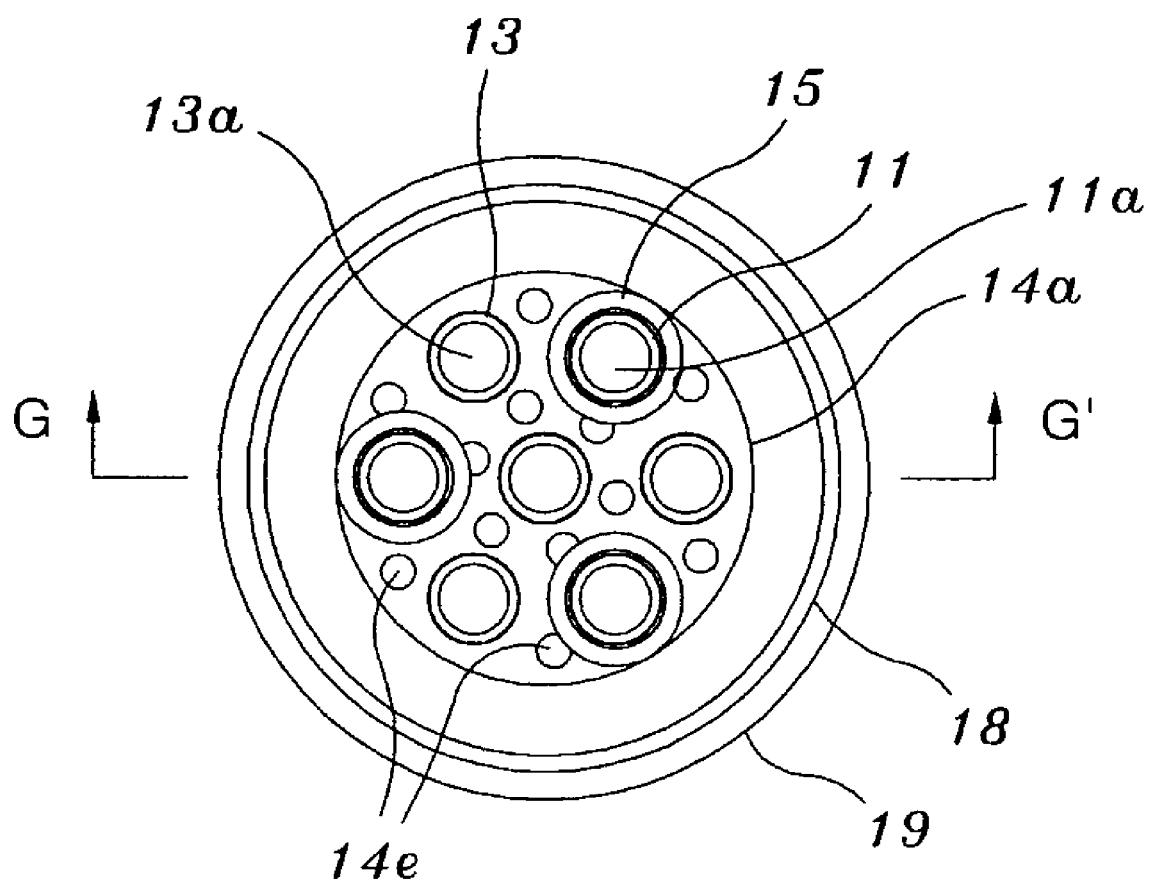
FIG. 15 is a schematic plan view illustrating a magnetized water production apparatus according to a fourth embodiment of the present invention.
Figure 16:
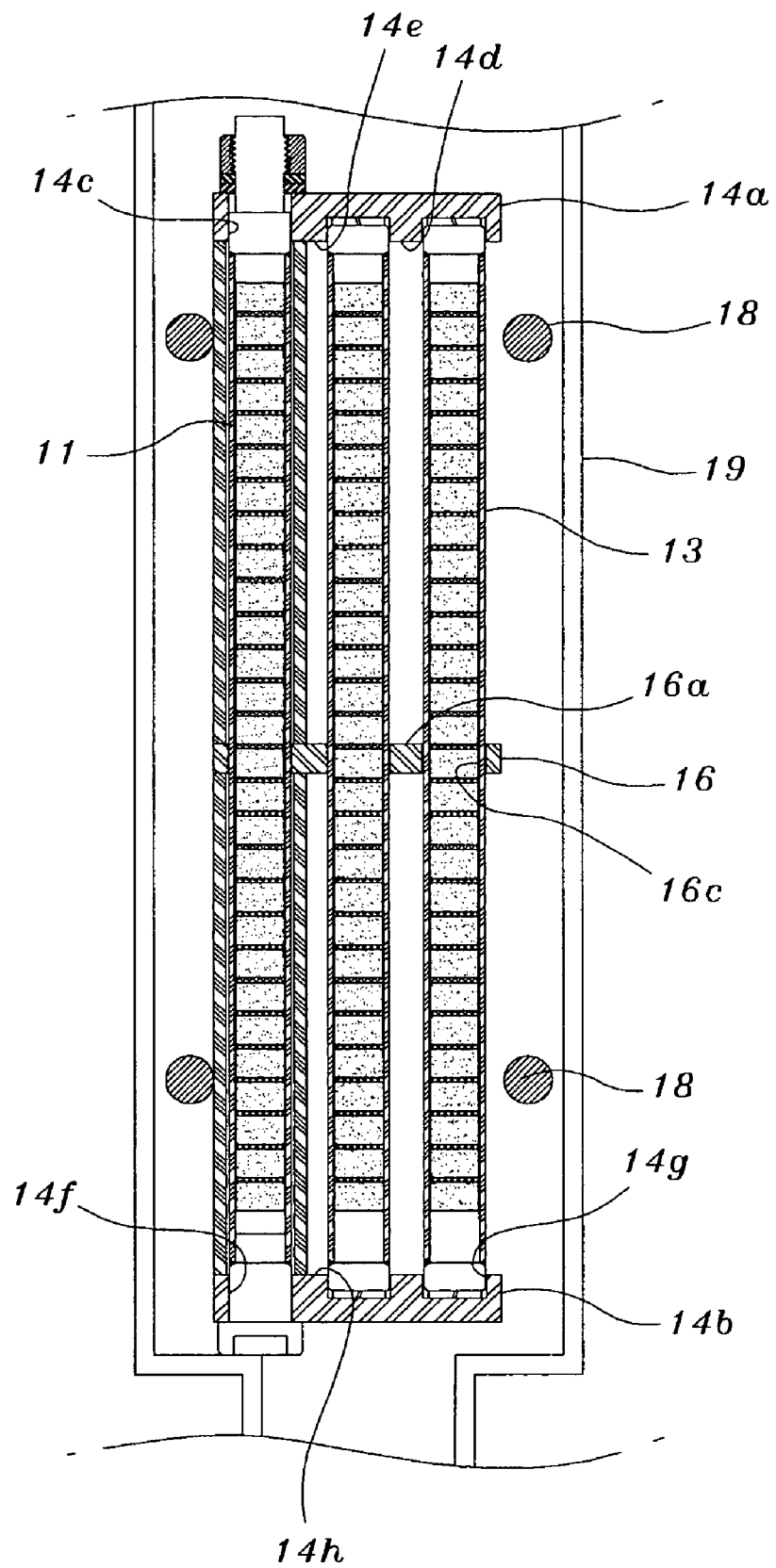
FIG. 16 is a sectional view taken along the line G-G' in FIG. 15.

FIG. 15 is a plan view illustrating a magnetized water production apparatus according to a fourth embodiment of the present invention, and FIG. 16 is a sectional view taken along the line G-G' in FIG. 15. FIGS. 15 and 16 illustrate the magnetized water production apparatus in which magnet bunches 10 are installed in a conventional water discharge pipe or a tap water pipe.

Referring to FIG. 1, FIG. 6, FIG. 7 and FIG. 8, the magnet bunches 10 of the magnetized water production apparatus 1 according to the present invention are directly installed in a water discharge pipe, a tap water pipe or a moisture discharge hole of a humidifier.

In order to install fixed magnet bars 11 and standard magnet bars 13, an upper plate 14a is provided with installation holes 14c and installation grooves 14d, and a lower plate 14b is provided with installation holes 14g and installation grooves 14g, in which the installation holes 14c and 14f and the installation grooves 14d and 14g are alternately arranged. The upper plate 14a and the lower plate 14b have respective central installation grooves 14d and 14g.

That is, the central installation grooves 14d and 14g are formed at center portions of the upper and lower plates 14a and 14b, respectively, and the installation grooves 14d and 14g for installing standard magnet bars 13 and the installation holes 14c and 14f for installing fixed magnet bars 11 are arranged in a circumferential direction.

According to this embodiment, the upper plate 14a has one central installation groove 14d, three installation holes 14c and three installation grooves 14d arranged in a circumferential direction around the one central installation groove 14d, and the lower plate 14b has one central installation groove 14g, three installation holes 14f, and three installation grooves 14g. However, the number of installation holes 14c and 14f and the installation grooves 14d and 14g may vary. Also, the upper plate 14a and the lower plate 14b can have central installation through holes 14c and 14f instead of the central installation grooves 14d and 14g, so that the fixed magnet bar 11 can be installed in the center of the magnet bunch 10.

The spacing plate 16 installed in the middle portion between the upper and lower plates 14a and 14b has a plurality of spacing holes 16c positioned to correspond to locations of the installation grooves and installation holes.

According to this embodiment, the magnet bunch 10 has elastic rubber rings 18 at an upper end portion and a lower end portion, respectively, in order to enable the magnet bunch 10 comprising many fixed magnet bars and many standard magnet bars to be installed in a water discharge pipe or a tap water pipe.

Thanks to the above described structure, the magnet bunch 10 can be installed in a water discharge hole 19 of a water discharge pipe or a tap water pipe. The diameter of the rubber rings 18 may vary according to the diameter of the water discharge hole 19 so that the magnet bunch 10 can be easily installed in the water discharge hole 19 and is prevented from being detached from the water discharge hole 19 and from being shaken.

By installing bare magnet bunches 10 in the water discharge hole, instead of installing a magnetized water production apparatus comprising a housing for the magnet bunches 10, it is possible to activate flowing water, and the water is discharged after flowing around the outer surface of the magnet bunch 10.

The upper and lower plates 14a and 14b, and the spacing plate 16 have many water passing holes 14e, 14h and 16a having different diameters and being through holes, and the water is magnetized while sequentially passing through the water passing holes 14e, 14h and 16a.

Here, the number of the elastic rubber rings 18 can also vary.

As described above, the magnetized water production apparatus according to the present invention has the following advantages.

First, since the apparatus is structured such that magnet bars are arranged in a radial manner, each magnet bar comprising a stainless steel pipe and neodymium based permanent magnets having a pellet shape with a small diameter, enclosed and arranged in the stainless steel pipe in a manner such that like poles thereof face each other, so that the apparatus provides a large contact area between the magnetic field and water, thereby effectively activating water by changing a large cluster of water molecules into small size clusters. The apparatus can enhance the activation efficiency of water by a synergistic effect in combination with the above described structure and a coating layer, made of natural stone, ceramic, or mixtures thereof, generating anions and far infrared rays, on the outer surfaces of magnet bars.

Second, since the apparatus is structured such that it can be disassembled, the apparatus can be easily uninstalled, washed and maintained. Further, the apparatus can be directly coupled to a tap water pipe, thereby being conveniently used and effectively activating water.

Third, since the apparatus is capable of sterilizing water while the water is magnetized in the apparatus, various waterborne diseases can be prevented.

Fourth, since the apparatus can effectively activate water from water works, it is possible to reduce the use of sodium hypochlorite, which is a sterilizing chemical.

Fifth, since the water magnetized using this apparatus has reduced specific heat, it is possible to save energy for heating water.

Sixth, if the apparatus is used when washing laundry, high washing efficiency can be achieved using a small amount of detergent.

Seventh, the apparatus can be used to activate blood or oils such as gasoline and kerosene.

While the present invention has been shown and described with particular reference to exemplary embodiments thereof, it will be understood by those of ordinary skill in the art that various changes in form and details may be made therein without departing from the spirit and scope of the present invention as defined by the following claims. Therefore, it is to be understood that the above-described embodiments have been provided only in a descriptive sense and will not be construed as placing any limitation on the scope of the invention.

What is claimed is:

1. An apparatus for producing magnetized water, comprising:
    a magnet bunch including:
        a plurality of fixed magnet bars;
        a plurality of standard magnet bars;
        an upper plate disposed on upper ends of the fixed and standard magnet bars;
        a lower plate disposed on lower ends of the fixed and standard magnet bars; and
        a spacing plate disposed between the upper and lower plates;
    a housing having a cylindrical main body for enclosing the magnet bunch therein, an opening at an upper end portion thereof, and a lower part having a funnel shape and a liquid passage; and
    a cover for covering the opening of the housing, the cover being coupled to the housing in a detachable manner and having a funnel shape and a liquid passage.

2. The apparatus according to claim 1, wherein the fixed magnet bars and the standard magnet bars are made of stainless steel.

3. The apparatus according to claim 1, wherein the fixed and standard magnet bars are made of synthetic resin.

4. The apparatus according to claim 1, wherein in each of the fixed and standard magnet bars, a plurality of permanent magnets are arranged in a manner such that like poles thereof face each other.

5. The apparatus according to claim 4, wherein the permanent magnets are made of cobalt/nickel or neodymium.

6. The apparatus according to claim 4, wherein spacing plates are provided at every interfaces between the adjacent permanent magnets in order to reduce a gap between the adjacent permanent magnets.

7. The apparatus according to claim 1, wherein each of the fixed and standard magnet bars has a hollowed cylindrical body which is sealed by an upper cover and a lower cover, respectively, through a welding method.

8. The apparatus according to claim 7, wherein each of the fixed magnet bars has a key protrusion on the upper cover thereof, and has a key groove corresponding to the key protrusion on the lower cover thereof, so that the key protrusion and the key groove engage with each other.

9. The apparatus according to claim 8, wherein the key protrusion is sequentially provided with a flat washer and a spring washer.

10. The apparatus according to claim 8, wherein the key protrusion has a threaded portion on its circumferential outer surface, and engages with a hexagonal nut.

11. The apparatus according to claim 7, wherein the lower plate of each of the fixed magnet bars has a protrusion.

12. The apparatus according to claim 1, wherein a spacing pipe is installed to surround each of the fixed magnet bars, and the spacing pipes are provided to an upper and a lower side of the spacing plate 16 in order to position the spacing plate 16 at a center portion of the fixed magnet bar.

13. The apparatus according to claim 1, wherein a coating layer formed of natural stones, ceramics or mixtures thereof, generating anions and far infrared rays, is formed on outer surfaces of the fixed and standard magnet bars.

14. The apparatus according to claim 1, wherein each of the upper plate and the lower plate is a disk-shaped plate, has a plurality of installation holes, arranged at regular intervals and being through holes, and a liquid passing hole, and has a plurality of installation grooves, each provided with a spring washer, in which the fixed magnet bars are installed such that respective ends of each of the fixed magnet bars are inserted into the installation holes of the upper and lower plates, and the standard magnet bars are installed such that respective ends of each of the standard magnet bars are received in the installation grooves formed in the upper and lower plates.

15. The apparatus according to claim 14, wherein diameters of the liquid passing holes formed to penetrate the upper and lower plates, respectively, are different from each other.

16. The apparatus according to claim 14, wherein diameters of the liquid passing holes formed to penetrate the upper and lower plates, respectively, are the same.

17. The apparatus according to claim 1, wherein each of the upper plate and the lower plate is a disk-shaped plate, has a plurality of installation holes, arranged at irregular intervals and being through holes, has a liquid passing hole, and has a plurality of installation grooves, each provided with a spring washer, in which the fixed magnet bars are installed in a manner such that both ends of each of the fixed magnet bars are inserted into the installation holes of the upper and lower plates, respectively, and the standard magnet bars are installed in a manner such that respective ends of each of the standard magnet bars are received in the installation grooves formed in the upper and lower plates, respectively.

18. The apparatus according to claim 1, wherein the upper plate has a central hole in a center portion thereof, and a plurality of installation holes and a plurality of installation grooves around the central hole, and the lower plate has a central support at a center portion thereof and a plurality of installation holes and a plurality of installation grooves, and the fixed magnet bars are installed in a manner such that respective ends of each of the fixed magnet bars are inserted into corresponding installation holes in the upper and lower plates, and the standard magnet bars are installed in a manner such that respective ends of each of the standard magnet bare are received in the corresponding installation grooves of the upper and lower plates.

19. The apparatus according to claim 1, wherein the spacing plate is a disk-shaped plate, and has a plurality of spacing holes and liquid passing hole, in which the holes are through holes and are arranged at regular intervals, so that the fixed and standard magnet bars are installed by being passed through the spacing holes.

20. The apparatus according to claim 19, wherein the liquid passing holes formed to penetrate the spacing plate have different diameters.

21. The apparatus according to claim 19, wherein the liquid passing holes formed to penetrate the spacing plate have the same diameter.

22. The apparatus according to claim 1, wherein the spacing plate is a disk-shaped plate, and has a plurality of spacing holes and liquid passing holes, in which the holes are through holes and are arranged at irregular intervals, so that the fixed and standard magnet bars are installed by being passed through the spacing holes.

23. The apparatus according to claim 1, wherein the spacing plate has a central spacing hole at a center portion thereof, and a plurality of spacing holes around the central spacing hole, in which the central spacing hole and the spacing holes are through holes.

24. The apparatus according to claim 1, wherein the housing and the cover are made of stainless steel.

25. The apparatus according to claim 1, wherein the housing and the cover are made of synthetic resin.

26. The apparatus according to claim 1, wherein inner surfaces of the housing and the cover are coated with natural stone, ceramic, and mixtures thereof, generating anions and far infrared rays.

27. The apparatus according to claim 1, wherein the housing has an O-ring contact part on an inner surface thereof near the opening, in which an O-ring is disposed on the O-ring contact part.

28. The apparatus according to claim 27, wherein the housing has an external O-ring groove on an outer surface near the opening thereof, and an O-ring is disposed in the O-ring groove.

29. The apparatus according to claim 1, wherein the housing has a support sill for supporting the magnet bunch, in which the support sill is formed on and along the circumferential inner surface thereof.

30. The apparatus according to claim 1, wherein the housing and the cover have respective threads to allow the housing and the cover to be coupled to external devices.

31. The apparatus according to claim 1, wherein the housing has a threaded portion on an outer surface and near an upper end portion thereof, and the cover has a threaded portion on an upper surface and near a lower end portion thereof, so that the housing and the cover are coupled by a screwing manner.

32. The apparatus according to claim 1, wherein the housing and the cover have respective octagonal portions on outer surfaces.

33. The apparatus according to claim 1, wherein the magnet bunch has elastic rubber rings near upper and lower end portions and on outer surfaces thereof, so that the magnet bunches can be directly installed in a water pipe.

* * * * *